US010868705B2

(12) United States Patent
Kneissl et al.

(10) Patent No.: US 10,868,705 B2
(45) Date of Patent: Dec. 15, 2020

(54) TRANSMITTER AND RECEIVER AND CORRESPONDING METHODS

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Jakob Kneissl, Fuerth (DE); Gerd Kilian, Erlangen (DE); Josef Bernhard, Nabburg (DE); Joerg Robert, Uttenreuth (DE); Johannes Wechsler, Spalt (DE); Stefan Ereth, Fuerth (DE); Wolfgang Koch, Schnaittach (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 16/598,871

(22) Filed: Oct. 10, 2019

(65) Prior Publication Data
US 2020/0052952 A1    Feb. 13, 2020

Related U.S. Application Data

(63) Continuation of application No. PCT/EP2018/025099, filed on Apr. 9, 2018.

(30) Foreign Application Priority Data

Apr. 11, 2017 (DE) .................. 10 2017 206 259

(51) Int. Cl.
*H04L 27/26* (2006.01)

(52) U.S. Cl.
CPC ...... *H04L 27/2675* (2013.01); *H04L 27/2613* (2013.01); *H04L 27/2657* (2013.01)

(58) Field of Classification Search
CPC ............ H04L 27/2675; H04L 27/2613; H04L 27/2657; H04B 1/707; H04B 1/70735;
(Continued)

(56) References Cited

U.S. PATENT DOCUMENTS

2006/0198455 A1 * 9/2006 Fujii ...................... H04L 1/0006
375/260
2008/0205451 A1 * 8/2008 Ramesh ............... H04L 5/0007
370/491
(Continued)

FOREIGN PATENT DOCUMENTS

DE    102011082098 B4    3/2013
EP       2914039 A1       9/2015
(Continued)

OTHER PUBLICATIONS

Choi, Z. Y. , et al., "Frame synchronization in the presence of frequency offset," Communications, IEEE Transactions on, vol. 50, No. 7, pp. 1062-1065, 2002.
(Continued)

*Primary Examiner* — Ted M Wang
(74) *Attorney, Agent, or Firm* — Michael A. Glenn; Perkins Coie LLP

(57) ABSTRACT

A transmitter is configured to transmit at least one signal with a pilot sequence having a plurality of pilot symbols, wherein the transmitter has a signal generator, wherein the signal generator provides the pilot sequence, wherein the signal generator provides the pilot sequence such that the pilot sequence has at least two symbol groups each having at least two pilot symbols, and the symbol groups, when evaluating a signal received by a receiver as a result of the
(Continued)

transmission of the signal with respect to a phase, the symbol groups generate phase errors that depend on a temporal off-set between a reference point in time of the transmission of the signal by the transmitter and a value assumed and/or estimated for the evaluation for the reference point in time, said phase errors essentially mutually compensating each other across the symbol groups in the evaluation.

16 Claims, 11 Drawing Sheets

(58) Field of Classification Search
CPC ........ H04B 2201/70701; H04B 1/7077; H04B 1/7083
See application file for complete search history.

(56) References Cited

U.S. PATENT DOCUMENTS

| | | | |
|---|---|---|---|
| 2010/0264906 | A1 | 10/2010 | Shamir et al. |
| 2011/0222419 | A1 | 9/2011 | Callaway et al. |
| 2011/0305296 | A1 | 12/2011 | Van |
| 2013/0230120 | A1* | 9/2013 | Yang ................ H04L 27/262 375/295 |
| 2014/0176341 | A1 | 6/2014 | Bernhard et al. |
| 2016/0366649 | A1 | 12/2016 | Bernhard et al. |
| 2018/0034673 | A1* | 2/2018 | Jin .................... H04L 25/0202 |

FOREIGN PATENT DOCUMENTS

| | | |
|---|---|---|
| RU | 2549146 C2 | 4/2015 |
| WO | 2009157758 A1 | 12/2009 |
| WO | 2015128385 A1 | 9/2015 |
| WO | 2017167366 A1 | 10/2017 |

OTHER PUBLICATIONS

De Gaudenzi, R. , et al., "Signal Synchronization for Direct-Sequence Code-Division Multiple Access Radio Modems;" European Transactions on Telecommunications, Jan.-Feb. 1998, vol. 9, No. 1, pp. 73-89.

Kilian, G. , et al., "Improved coverage for low-power telemetry systems using telegram splitting," in Proceedings of 2013 European Conference on Smart Objects, Systems and Technologies (SmartSysTech); XP-002763748; 2013.

Kilian, G. , et al., "Increasing Transmission Reliability for Telemetry Systems Using Telegram Splitting," IEEE Transactions on Communications, vol. 63, No. 3, pp. 949-961, Mar. 2015.

Lambrette, Uwe , et al., "Comparison of Demodulation Techniques for MSK," RWTH Aachen, https://www.ice.rwth-aachen.de/fileadmin/publications/Lambrette95TIRR.pdf, last retrieved: Sep. 19, 2016.

Mengali, Umberto , et al., "Synchronization Techniques for Digital Receivers" Plenum Press, 1997, ISBN 0-306-45725-3.

Park, Byungjoon , et al., "A novel timing estimation method for OFDM systems", IEEE Communications Letters, IEEE Service Center, Piscataway, NJ, US, vol. 7, No. 5, May 1, 2003 (May 1, 2003), pp. 239-241, XP011423731.

Sust, M. K., et al., "Rapid acquisition concept for voice activated CDMA communication;" IEEE Global Telecommunications Conference, 1990 Bd. 3, 1990, S. 1820#1826.

Weibing, Chen , et al., "A Study of OFDM Synchronization Algorithm Based on Coaxial Cable Operating at Gigabit", Intelligent System Design and Engineering Application (ISDEA), 2012 Second International Conference on, IEEE, Jan. 6, 2012 (Jan. 6, 2012), pp. 143-146, XP032154975.

Yu, ZH. H , et al., "OFDM Timing and Frequency Offset Estimation Based on Repeated Training Sequence", Wireless Communications, Networking and Mobile Computing, 2007. WICOM 2007. International Conference on, IEEE, Piscataway, NJ, USA, Sep. 21, 2007 (Sep. 21, 2007), pp. 264-266, XP031261247.

Kay, Steven M., "Fundamentals of Statistical Signal Processing—vol. 2: Detection Theory", Prentice Hall, 1998, ISBN: 0-13-345711-7, 1998.

Kellermann, Walter , et al., "Digital Signal Processing", lecture notes from WS 2016/17, Chair in Multimedia Communication and Signal Processing (LMS) at the Friedrich-Alexander-University Erlangen-Nuernberg, 2006.

Koch, Wolfgang , Script for the Seminar Empfängersynchronisation (Receiver Synchronization) at Fraunhofer IIS, Jun. 10, 2015-Jun. 15, 2015, 2015.

* cited by examiner

TRANSMITTER AND RECEIVER AND CORRESPONDING METHODS

CROSS-REFERENCES TO RELATED APPLICATIONS

This application is a continuation of copending International Application No. PCT/EP2018/025099, filed Apr. 9, 2018, which is incorporated herein by reference in its entirety, and additionally claims priority from German Application No. DE 10 2017 206 259.2, filed Apr. 11, 2017, which is incorporated herein by reference in its entirety.

BACKGROUND OF THE INVENTION

The invention relates to a transmitter as well as to a receiver, and corresponding methods for transmitting signals or for synchronizing a receiver by a transmitter.

In many data transmission systems, pilot sequences (also referred to as training sequences or synchronization sequences) are inserted into the data streams to be transmitted for signal detection or parameter estimation. This can be both the transmission of an uninterrupted data stream in which pilot sequences are scattered at certain intervals, and a packet-oriented transmission in which each packet (also referred to as telegram) usually contains exactly one pilot sequence. The pilot sequence is also called preamble or midamble if it is located at the beginning or in the middle of the packet. However, a pilot sequence can also be distributed within the packet in the form of two or more subsequences.

In some radio-based systems with asynchronous packet transmission, the transmission pauses are considerably longer than the respective packet duration. Some systems use telegram splitting (see [4] and [1], DE 10 2011 082 098 A1) in which each packet is divided into a number of subpackets—referred to as fragments or telegram fragments. As a rule, each fragment thereby contains its own pilot sequence. Telegram splitting proves to be particularly robust in interference-limited systems in which a large number of transmitters transmit uncoordinated telegrams that are to be received and decoded by one single receiver. This occurs, for example, in telemetry systems, sensor networks or applications under the keyword Internet of Things (IoT).

The demodulation of data of a radio-based data transmission system involves a receiver synchronization consisting of:

Time synchronization: estimation of the exact time position of the packet as well as the optimal sampling time.

Frequency synchronization: estimation and correction of the frequency offset between the transmission and receive oscillators, thus, the frequency difference between the carrier frequency of the transmission signal and the center frequency of the receive filter.

Phase synchronization: estimation of the phase after frequency correction (only needed for coherent demodulation).

In asynchronous packet transmission, these three types of synchronization must be carried out before demodulation for each packet, independently of the packets received previously. For this purpose, each packet contains a pilot sequence by means of which the initial acquisition can be carried out. In addition, tracking of the parameters may be needed during data demodulation. In the following, the problem of initial acquisition is considered.

Telegram splitting offers the advantage that in particular systems with a large number of uncoordinated transmitters are robust against packet collisions. For telegram splitting, however, no approaches are known in the field of synchronization and, in particular, frequency synchronization that lead to satisfactory results.

SUMMARY

An embodiment may have a transmitter, wherein the transmitter is configured to transmit at least one signal with a pilot sequence having several pilot symbols, wherein the transmitter has a signal generator, wherein the signal generator provides the pilot sequence, wherein the signal generator provides the pilot sequence such that the pilot sequence has at least two symbol groups with at least two pilot symbols each, and wherein, in an evaluation of a signal received by a receiver as a result of the transmission of the signal with respect to a phase, the symbol groups generate phase errors that depend on a time offset between a reference point in time of the transmission of the signal by the transmitter and a value assumed and/or estimated for the evaluation for the reference point in time, said phase errors essentially mutually compensating each other across the symbol groups in the evaluation, wherein the signal generator provides the pilot sequence with a length of at least eight or twelve pilot symbols such that the pilot sequence or a portion of the pilot sequence that forms part of the pilot sequence once or several times has one of the following forms:

[0, 1, 0, 0, 0, 0, 1, 0],
[1, 0, 1, 1, 1, 1, 0, 1],
[0, 0, 0, 1, 0, 1, 1, 1],
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 1, 1, 0, 1],
[1, 0, 1, 0, 0, 1, 0, 0, 0, 0, 1],
[1, 0, 1, 0, 1, 1, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0], wherein the zeros and ones are each pilot sequence bits prior to a modulation.

Another embodiment may have a transmitter, wherein the transmitter is configured to transmit at least two signals each having a subpilot sequence with a plurality of pilot symbols, wherein the transmitter has a signal generator, wherein the signal generator provides the subpilot sequence, wherein the signal generator provides the subpilot sequences of the signals such that the subpilot sequences each have at least one symbol group with at least two pilot symbols, and wherein the symbol groups of the signals generate phase errors which are dependent on a time offset between a reference point in time of the respective transmission of a signal and a value assumed and/or estimated for the evaluation for the reference point in time during an evaluation of signals received from a receiver as a result of the transmission of the signals with respect to a phase, said phase errors substantially compensating each other during the evaluation jointly across the signals, wherein the signal generator provides the subpilot sequences so that the subpilot sequences altogether have a portion which is present in a single or multiple form and has the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
 wherein the zeros and ones are each pilot sequence bits prior to a modulation.

Another embodiment may have a method for transmitting signals, wherein the signals are transmitted with a pilot sequence each having a plurality of pilot sequence symbols, wherein the pilot sequences are provided such that the pilot sequences each have at least two symbol groups each having at least two pilot symbols, and wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation over the symbol groups, wherein the signal generator provides the pilot sequence with a length of at least eight or twelve pilot symbols such that the pilot sequence or a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
 wherein the zeros and ones are each pilot sequence bits prior to a modulation.

Another embodiment may have a method for transmitting signals, wherein at least two signals are transmitted each with a subpilot sequence having a plurality of pilot sequence symbols, wherein the subpilot sequences are provided such that the subpilot sequence each has at least one symbol group each having at least two pilot symbols, and wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation across the signals, wherein the signal generator provides the subpilot sequences so that the subpilot sequences altogether have a portion which is present in a single or multiple form and has the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],

[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

Another embodiment may have a non-transitory digital storage medium having a computer program stored thereon to perform the method for transmitting signals, wherein the signals are transmitted with a pilot sequence each having a plurality of pilot sequence symbols, wherein the pilot sequences are provided such that the pilot sequences each have at least two symbol groups each having at least two pilot symbols, and wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation over the symbol groups, wherein the signal generator provides the pilot sequence with a length of at least eight or twelve pilot symbols such that the pilot sequence or a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 1, 0, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation, when said computer program is run by a computer.

Another embodiment may have a non-transitory digital storage medium having a computer program stored thereon to perform the method for transmitting signals, wherein at least two signals are transmitted each with a subpilot sequence having a plurality of pilot sequence symbols, wherein the subpilot sequences are provided such that the subpilot sequence each has at least one symbol group each having at least two pilot symbols, and wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation across the signals, wherein the signal generator provides the subpilot sequences so that the subpilot sequence s altogether have a portion which is present in a single or multiple form and has the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 1, 0, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation, when said computer program is run by a computer.

Another embodiment may have a transmitter, wherein the transmitter is configured to transmit at least one signal with a pilot sequence having several pilot symbols, wherein the transmitter has a signal generator that provides the pilot sequence, wherein the signal generator provides the pilot sequence with a length of at least twelve pilot symbols such that the pilot sequence has one of the following forms or such that a portion of the pilot sequence that forms part of the pilot sequence once or several times has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],

[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0], wherein the zeros and ones are each pilot sequence bits prior to a modulation.

Another embodiment may have a transmitter, wherein the transmitter is configured to transmit at least one signal with a pilot sequence having several pilot symbols, wherein the transmitter has a signal generator that provides the pilot sequence, wherein the signal generator provides the pilot sequence with a length of at least eight pilot symbols such that the pilot sequence has one of the following forms or such that a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
wherein the zeros and ones are each pilot sequence bits prior to a modulation.

Another embodiment may have a method for transmitting signals, wherein at least one signal with a pilot sequence with several pilot symbols is transmitted, wherein the pilot sequence is provided, wherein the pilot sequence with a length of at least twelve pilot symbols is provided such that the pilot sequence has one of the following forms or such that a portion of the pilot sequence that forms part of the pilot sequence once or several times has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

Another embodiment may have a non-transitory digital storage medium having a computer program stored thereon to perform the method for transmitting signals, wherein at least one signal with a pilot sequence with several pilot symbols is transmitted, wherein the pilot sequence is provided, wherein the pilot sequence with a length of at least twelve pilot symbols is provided such that the pilot sequence has one of the following forms or such that a portion of the pilot sequence that forms part of the pilot sequence once or several times has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation, when said computer program is run by a computer.

Another embodiment may have a non-transitory digital storage medium having a computer program stored thereon to perform the method for transmitting signals, wherein at least one signal with a pilot sequence with several pilot symbols is transmitted, wherein the pilot sequence is provided, wherein the pilot sequence with a length of at least eight pilot symbols is provided such that the pilot sequence has one of the following forms or such that a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
wherein the zeros and ones are each pilot sequence bits prior to a modulation, when said computer program is run by a computer.

The transmitter is configured to transmit at least one signal with a pilot sequence or subpilot sequence comprising several pilot symbols. The transmitter comprises a signal generator that provides the pilot sequence or subpilot sequence.

In one configuration it is provided that the transmitter is configured to transmit at least one signal with a pilot sequence comprising a plurality of pilot symbols. The signal generator provides the pilot sequence such that the pilot sequence includes at least two symbol groups with at least two pilot symbols each. Thereby, when evaluating a signal received from a receiver as a result of the transmission of the signal, the symbol groups generate phase errors which are dependent on a time offset between a reference point in time of the transmission of the signal by the transmitter and a value assumed and/or estimated for the evaluation for the reference point in time and which substantially mutually compensate each other across the symbol groups during the evaluation.

One configuration is that the symbol groups partially overlap. In this configuration, for example, at least one symbol belongs to two symbol groups.

In one configuration it is provided that at least one symbol group consists of a middle symbol and two flanking symbols. In one configuration, the middle symbol thereby is the symbol that is evaluated in relation to the phase.

One configuration is that the transmitter is configured to transmit signals with at least one pilot sequence comprising at least four pilot symbols.

In one configuration it is provided that the transmitter transmits signals comprising pilot sequences resulting from MSK modulation. The MSK modulation is therefore an example of a modulation for generating the pilot symbols of the signals to be transmitted. Alternatively, this is a GMSK modulation.

One configuration is that the transmitter outputs data to be output by at least two telegram fragments which the transmitter transmits as individual signals and which are shorter than a single telegram comprising the entire data, and that at least one telegram fragment comprises the pilot sequence generated by the signal generator or a subpilot sequence associated with the pilot sequence. Telegram splitting is therefore used in this configuration. One feature of telegram splitting is that synchronization with a telegram fragment is usually not possible (e.g. with a low SNR or interference in the channel).

In one configuration, it is provided that the signal generator provides the pilot sequence with a length of at least eight pilot symbols such that the pilot sequence has one of the following forms:

[0, 1, 0, 0, 0, 0, 1, 0],
[1, 0, 1, 1, 1, 1, 0, 1],
0, 0, 0, 1, 0, 1, 1, 1] or
[1, 1, 1, 0, 1, 0, 0, 0].

The zeros and ones are the pilot sequence bits before a modulation, thus, before the mapping from which the actual pilot symbols result. An example of mapping is an MSK mapping which will be described in the following (see FIG. 11).

One configuration is that the signal generator provides the pilot sequence with a length of at least eight pilot symbols in such a way that a portion of the pilot sequence that is a single or multiple part of the pilot sequence has one of the following forms:
[0, 1, 0, 0, 0, 0, 1, 0],
[1, 0, 1, 1, 1, 1, 0, 1],
0, 0, 0, 1, 0, 1, 1, 1] or
[1, 1, 1, 0, 1, 0, 0, 0], The zeros and ones each are the pilot sequence bits before a modulation from which the actual pilot symbols result. An example of mapping is an MSK mapping, which will be described in the following (see FIG. 11).

In one configuration it is provided that the signal generator provides the pilot sequence with a length of at least twelve pilot symbols such that the pilot sequence has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 1, 0, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 1, 0, 1, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
1, 1, 1, 1, 1, 1, 0, 0, 1, 0, 1, 0, 0, 0] or
[1, 1, 1, 1, 1, 0, 1, 0, 1, 1, 0, 0].

The zeros and ones are the pilot sequence bits before a modulation. An example of mapping is an MSK mapping, which will be described in the following (see FIG. 11).

One configuration is that the signal generator provides the pilot sequence with a length of at least twelve pilot symbols such that a portion of the pilot sequence that is single or multiple part of the pilot sequence has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],

[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 1, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
1, 1, 1, 1, 1, 1, 0, 0, 1, 0, 1, 0, 0, 0] or
[1, 1, 1, 1, 1, 0, 1, 0, 1, 1, 0, 0].

The zeros and ones each are the pilot sequence bits before a modulation, thus, before a mapping. An example of mapping is an MSK mapping, which will be described in the following (see FIG. 11).

The transmitter thus uses pilot sequences for an improved phase estimation—even fragmented, for example—when time offsets occur.

The phase between the transmitter (or transmitter frequency) and the receiver (or receiver frequency) is determined. This phase is influenced by the time offset that is derived from a reference point in time of the transmission of a signal and a value assumed or estimated during evaluation. For example, the reference point in time is the time at which a signal or a pilot symbol of a pilot sequence of the signal is transmitted. If an incorrect value (reference point in time) is assumed or estimated during the evaluation of the pilot sequence, this has a direct effect on the determination of the phase. Therefore, the transmitter transmits signals with pilot sequences the symbols of which when a time offset occurs generate such phase errors as errors—in the determination of the phase—which are essentially compensated on average through the phase values determined per symbol.

Furthermore, the invention achieves the object by means of a method for transmitting signals.

The method comprises at least the following steps:

The signals are each transmitted with a pilot sequence comprising several pilot sequence symbols.

The pilot sequences are provided such that the pilot sequences each comprise at least two symbol groups with at least two pilot symbols each. Thereby, when evaluating a signal received from a receiver as a result of the transmission of the signal, the symbol groups generate phase errors which are dependent on a time offset between a reference point in time of the transmission of the signal by the transmitter and a value assumed and/or estimated for the evaluation for the reference point in time and which substantially mutually compensate each other during the evaluation across the symbol groups.

The above configurations of the transmitter can be implemented by steps of corresponding configurations of the method so that here a repetition of the embodiments is dispensed with.

The following configurations relate to the fact that the transmitter transmits several signals, each with a subpilot sequence. In order to determine the phase between transmitter and receiver, individual phase values are determined for each individual signal and the individual phase values are then averaged across the signals. For this reason, phase errors, for example, do not compensate each other within a signal, but only through the evaluation of (advantageously all) received signals. The signals are therefore, for example, telegram fragments in a form that do not have a complete pilot sequence, but only subpilot sequences that complement each other to form the complete pilot sequence. An estimation across several subpilot sequences can advantageously only be applied if the individual subpilot sequences have been transmitted coherently and could still be received coherently at the receiver.

Therefore, according to a complementary or alternative configuration, the invention relates to a transmitter which is configured to transmit at least two signals, each with a subpilot sequence comprising several pilot symbols. The signal generator provides the subpilot sequences of the signals such that the subpilot sequences each have at least one symbol group with at least two pilot symbols, wherein the symbol groups of the signals generate phase errors which are dependent on a time offset between a reference point in time of the transmission of the signal by the transmitter and a value assumed and/or estimated for the evaluation for the reference point in time and which substantially mutually compensate each other during the evaluation across the signals.

In contrast to the previous configurations, the phase errors in this configuration thus compensate each other when evaluating across several signals.

According to one configuration, at least one subpilot sequence has at least two symbol groups, whereby the symbol groups partially overlap.

One configuration provides that at least one symbol group consists of a middle symbol and two flanking symbols.

According to a configuration, the transmitter transmits signals that have subpilot sequences resulting from MSK modulation.

One configuration provides that the signal generator provides the subpilot sequences such that the subpilot sequences together comprise a portion which is present in a single or multiple form and has the following forms:
[0, 1, 0, 0, 0, 0, 1, 0],
[1, 0, 1, 1, 1, 1, 0, 1],
0, 0, 0, 1, 0, 1, 1, 1] or
[1, 1, 1, 0, 1, 0, 0, 0].

The zeros and ones each are pilot sequence bits before a modulation. An example of mapping is an MSK mapping, which will be described in the following (see FIG. 11).

According to a configuration, the signal generator provides the subpilot sequences such that the subpilot sequences together have a portion which is present in a single or multiple form and has the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 1, 1, 1, 0, 1],
[1, 0, 1, 0, 0, 0, 1, 0, 0, 0, 0, 1],
[1, 0, 1, 0, 1, 1, 0, 0, 0, 0, 0, 1],

[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
1, 1, 1, 1, 1, 1, 0, 0, 1, 0, 1, 0, 0, 0] or
[1, 1, 1, 1, 1, 0, 1, 0, 1, 1, 0, 0].

The zeros and ones are pilot sequence bits before a modulation, thus, before a mapping, to generate the pilot symbols. An example of mapping is an MSK mapping, which will be described in the following (see FIG. 11).

The above-mentioned configurations thus relate, as it were, to an extension of the averaging with regard to the phase in a pilot sequence splitting.

If the pilot sequence is divided into several subareas, the performance in frequency estimate is improved because the difference between the subpilot sequences can also be used for frequency estimate if the coherence between the subpilot sequences is given.

If the same number of symbols of the subpilot sequences is sent per signal, the length of the subpilot sequences is reduced in relation to the total pilot sequence by the factor of the number of split pilot sequences.

The coherence between the subpilot sequences is given in one configuration.

Altogether, the subpilot sequences are defined such that the sum of the phase errors is minimized in case of time shift over several subpilot sequences.

The receiver therefore determines the phase not only from one signal, but from several signals.

One configuration of a method for transmitting signals comprises at least the following steps:

At least two signals, each with a subpilot sequence comprising several pilot sequence symbols, are transmitted.

The subpilot sequences shall be provided such that each subpilot sequence comprises at least one symbol group with at least two pilot symbols each.

Thereby, when evaluating signals received from a receiver (10) as a result of the transmission of the signals, the symbol groups generate phase errors which are dependent on a time offset between a reference point in time of the transmission of the signal by the transmitter and a value assumed and/or estimated for the evaluation for the reference point in time and which substantially mutually compensate each other during the evaluation through the symbol groups.

The above configurations of the transmitter can be implemented by steps of corresponding method configurations so that here a repetition of the embodiments is dispensed with.

In addition, the invention achieves the object by a receiver.

In particular, in one configuration, the receiver is independent of the configuration of the transmitter and, in particular, not related to a transmitter the configurations of which have been described above. In alternative configurations, the receiver is dependent on the type of signal transmission by the transmitter so that receiver and transmitter form a system for data or information communication.

The receiver is configured to receive at least one signal transmitted by a transmitter. The receiver comprises a synchronization device. The synchronization device is configured to carry out a synchronization of the receiver with the transmitter based on the received signal. The receiver comprises a signal evaluation device, wherein the signal evaluation device determines synchronization data from the received signal and transmits it to the synchronization device for synchronization.

One configuration of the receiver provides that the synchronization device is configured to carry out a synchronization of the receiver with the transmitter starting from a pilot sequence or a subpilot sequence of the received signal.

In one configuration, based on symbols of the pilot sequence or the subpilot sequence and based on symbols of a known reference sequence or a part of a known reference sequence, the signal evaluation device determines several (thus at least two) values for a phase between a pilot sequence or a subpilot sequence of the signal transmitted by the transmitter and the signal received by the receiver as a result of the transmission of the signal. Starting from the values for the phase, the signal evaluation device determines a total value for the phase and transmits the total value to the synchronization device for synchronization.

One configuration of the receiver provides that the signal evaluation device averages the values for the phases to determine the total value for the phase.

In one configuration, the receiver receives several signals transmitted by the transmitter. Starting from each received signal, the signal evaluation device determines data for synchronization. The synchronization device uses the data obtained from the received signals together for synchronization.

One configuration of the receiver provides that the receiver receives several signals transmitted by the transmitter, each comprising a subpilot sequence. The subpilot sequence s complement each other to form a pilot sequence. The signal evaluation device determines synchronization data based on each subpilot sequence separately for each subpilot sequence.

In one configuration, the receiver receives several signals transmitted by the transmitter, each comprising a subpilot sequence. The subpilot sequences complement each other to form a pilot sequence. The signal evaluation device merges the subpilot sequences and then determines data for synchronization based on the merged subpilot sequences.

One configuration of the receiver provides that the signal evaluation device, when evaluating a pilot sequence of a received signal, separates the pilot sequence into at least two subpilot sequences and determines synchronization data separately for each of the at least two sub-pilot sequences.

In one configuration, the signal evaluation device, when evaluating a pilot sequence of a received signal, determines a time offset between a reference point in time of a transmission of the signal by the transmitter and a value assumed and/or estimated for evaluation for the reference point in time. Thereby, the signal evaluation device accesses symbols of a reference sequence adapted to the time offset for further evaluation of the pilot sequence.

One configuration of the receiver provides that the signal evaluation device, when evaluating a subpilot sequence of a received signal, determines a time offset between a reference point in time of a transmission of the signal by the transmitter and a value assumed and/or estimated for the evaluation for the reference point in time. For further evaluation of the subpilot sequence, the signal evaluation device accesses symbols of a part of a reference sequence adapted to the time offset or of a part of a reference sequence, the part being adapted to the time offset.

In one configuration, the signal evaluation device carries out the adaptation of the reference sequence or part of the reference sequence by the signal evaluation device shifting a known reference sequence or part of a known reference sequence in time by the determined time offset.

One configuration of the receiver provides that the signal evaluation device carries out the adaptation of the reference sequence or part of the reference sequence by the signal evaluation device accessing a data memory with correspondingly stored reference sequence s or parts of reference sequences.

In one configuration, the receiver comprises a filter device and a scanning device.

One configuration thus relates to a correction of the reference symbols or the reference sequence for the evaluation of the received signals.

The adaptation of the reference sequence is advantageous, for example, for the case that oversampling of the received signals is very small. In addition, the time offset can be estimated much more accurately, for example by interpolation, than this is possible for a correction, e.g. by the effect of the filter.

Therefore, the reference symbols of the reference sequence associated with the respective received signal are shifted by the determined value of the time offset. The corrected reference symbols or those adapted to the time offset are then used to estimate the phase error. Thus the time offset of the symbols in the estimate can be almost completely suppressed. The adjusted reference sequences are therefore calculated depending on the determined or, for example, estimated time offset or taken from a data memory, e.g. a look-up table.

Furthermore, the invention achieves the object by a method for synchronizing a receiver with a transmitter. In one configuration, the synchronization method is part of a method for receiving signals transmitted by a transmitter and received by a receiver. The method basically comprises receiving at least one signal from the transmitter, evaluating the signal to obtain synchronization data, and synchronizing the receiver using the synchronization data.

In one configuration, the method comprises at least the following steps:
  At least one signal transmitted by the transmitter is received by the receiver.
  Starting from a pilot sequence or a subpilot sequence of the received signal, a synchronization of the receiver is carried out by the transmitter.

One configuration provides that, based on symbols of the pilot sequence or of the subpilot sequence of the transmitted signal and a signal received from the receiver in succession to the transmission of the signal, a plurality of values are determined for a phase between a pilot sequence or a subpilot sequence of the signal transmitted by the transmitter and the signal received from the receiver in succession to the transmission of the signal, and that, starting from the values for the phase, an overall value for the phase is determined and used for synchronization.

In one configuration it is provided that a plurality of transmitted signals are received, that data for synchronization are determined from each received signal, and that the determined data are used together for synchronization.

One configuration provides that a time offset is determined between a reference point in time of a transmission of the signal by the transmitter and a value assumed and/or estimated for the reference point in time, and that a pilot sequence of the received signal is evaluated with symbols of a reference sequence adapted to the time offset.

In one configuration it is provided that a time offset is determined between a reference point in time of a transmission of the signal by the transmitter and a value assumed and/or estimated for the reference point in time, and that a subpilot sequence of the received signal is evaluated with symbols of a part of a reference sequence adapted to the time offset or with symbols of a part of a reference sequence, the part being adapted to the time offset.

The above configurations of the receiver can be realized by steps of corresponding configurations of the method so that here a repetition of the explanations is dispensed with.

The following configurations of a receiver relate to the DFT procedure for determining the data for synchronizing the receiver with the transmitter. The following configurations at least partially supplement the previous configurations or represent independent alternatives.

One configuration of the receiver provides that the receiver is configured to receive a plurality of telegram fragments transmitted by the transmitter, wherein the telegram fragments each comprise a subpilot sequence, wherein the telegram fragments complement each other to form a telegram containing data transmitted by the transmitter, and wherein the telegram fragments are shorter than a single telegram comprising the transmitted data. In addition, the subpilot sequences complement each other to form a pilot sequence. The signal evaluation device determines a value for a frequency difference between a transmission frequency of the transmitter and a receive frequency of the receiver based on the subpilot sequences and using the DFT method. This determination is executed by the signal evaluation device determining values of decision variables for each subpilot sequence, by the signal evaluation device combining the determined values of the decision variables over the subpilot sequences and performing a determination of a maximum value with the combined values. Optionally, the maximum value can be compared with a decision threshold.

In one configuration it is provided that the signal evaluation device determines the values of the decision variables for each subpilot sequence by the signal evaluation device for a plurality of frequencies of a complex exponential oscillation referred to as frequency hypotheses forming multiplication values of a multiplication of samples of the respective subpilot sequence with conjugated complex values of an equal number of reference symbols of a known reference sequence and with samples of the complex exponential oscillation and summing up the multiplication values.

According to one configuration, the signal evaluation device combines the values of the decision variables determined for the subpilot sequences together (hence jointly over the subpilot sequences) for the subpilot sequences with each other by the signal evaluation device adding the amounts of the values of the decision variables.

In one configuration it is provided that the signal evaluation device combines the values of the decision variables determined for the subpilot sequences together for the subpilot sequences with each other by the signal evaluation device forming a sum of the amounts of a real part and an imaginary part of the values of the decision variables.

According to one configuration, the signal evaluation device combines the values of the decision variables determined for the subpilot sequences together for the subpilot sequence s by the signal evaluation device summing up the magnitude squares of the values of the decision variables.

In one configuration it is provided that the signal evaluation device coherently combines the values of the decision variables determined for the subpilot sequences together for the subpilot sequences, taking into account the magnitude and phase of the values of the decision variables.

According to one configuration, the signal evaluation device combines the determined values of the decision variables with each other taking into account weighting factors.

In one configuration, it is provided that the signal evaluation device combines the determined values of the decision variables with the inclusion of weighting factors relating to the subpilot sequences.

According to one configuration, the signal evaluation device determines the weighting factors based on a signal-to-noise ratio of the respective telegram fragment.

In one configuration it is provided that the signal evaluation device determines the weighting factors as proportional to a root of the signal-to-noise ratio.

According to one configuration, the signal evaluation device determines the weighting factors as proportional to a root from a quotient of the signal-to-noise ratio and the noise power of the respective telegram fragment.

In one configuration it is provided that the signal evaluation device determines the weighting factors as a function of a computing power available to the signal evaluation device or as a function of a ratio of the signal-to-noise ratio relative to a predeterminable relation value or as a function of an interference power either as proportional to a root of the signal-to-noise ratio or as proportional to a root of a quotient of the signal-to-noise ratio and a noise power of the respective telegram fragment.

According to one configuration, the receiver is arranged to receive a plurality of telegram fragments transmitted by the transmitter, wherein the telegram fragments each comprise a subpilot sequence, wherein the telegram fragments complement each other to form a telegram containing data transmitted by the transmitter, wherein the telegram fragments are shorter than a single telegram comprising the transmitted data, and wherein the subpilot sequences complement each other to form a pilot sequence. The signal evaluation device determines a value for a frequency difference between a transmission frequency of the transmitter and a receive frequency of the receiver, starting from the subpilot sequences and using the DFT method, by the signal evaluation device determining values of decision variables for each subpilot sequence, combining the determined values of the decision variables over the subpilot sequences with one another and carrying out a determination of a maximum value with the combined values. Thereby, the signal evaluation device carries out a time estimate for a time offset between a reference point in time of a transmission of the telegram fragment and a value assumed and/or estimated for the evaluation of the telegram fragment for the reference point in time, by the signal evaluation device determining a time estimate value for a time offset on the basis of a maximum value obtained by determining the maximum value and at least one value adjacent to the maximum value with respect to a time variable.

In one configuration it is provided that the receiver is configured to receive at least one telegram transmitted by the transmitter, wherein the telegram comprises a pilot sequence. The signal evaluation device determines, starting from the pilot sequence and using the DFT method, a value for a frequency difference between a transmission frequency of the transmitter and a receive frequency of the receiver by the signal evaluation device determining values of decision variables for the pilot sequence, executing a determination of a maximum value. Thereby, the signal evaluation device carries out a time estimate for a time offset between a reference point in time of a transmission of the telegram and a value assumed and/or estimated for the evaluation of the telegram for the reference point in time, by the signal evaluation device determining a time estimate value for a time offset on the basis of a maximum value obtained by determining the maximum value and at least one value adjacent to the maximum value with respect to a time variable.

According to one configuration, starting from the maximum value determined by the maximum value and a positive comparison of the maximum value with a decision threshold, the signal evaluation device obtains the maximum value.

In one configuration it is provided that the signal evaluation device generates the estimated time value from the maximum value and two adjacent values, and that the two adjacent values precede or follow the determined maximum value with respect to the time variable.

According to one configuration, the signal evaluation device determines a polynomial for the maximum value and the two adjacent values. In addition, the signal evaluation device determines the estimated time value from an extreme value associated with the polynomial.

One configuration is that the signal evaluation device carries out the interpolation with a second degree polynomial.

In accordance with one configuration, the signal evaluation device (12) performs the interpolation with a polynomial of the following form: $y(x)=y_0-c(x-x_0)^2$, the free parameters $y_0$, c and $x_0$ being determined on the basis of the maximum value and the adjacent values.

The transformation device determines a maximum value of the interpolation curve with the following function:

$$x_0 = \frac{1}{2}\frac{y(1)-y(-1)}{2y(0)-y(1)-y(-1)},$$

wherein $x_0$ is an abscissa value of a maximum of the polynomial, y(0) is the maximum value, and y(−1) and y(1) are the adjacent values.

A second degree polynomial of the form $y(x)=y_0-c(x-x_0)^2$ is used as an interpolation function in one configuration.

The abscissa value $x_0$ of the polynomial maximum, for example, represents the improved time estimate (normalized to the sampling interval T/N).

From the abscissa value $x_0$ of the polynomial maximum, the improved frequency estimated value can be calculated via $$\hat{v}T = \frac{i_0+x_0}{N_{FFT}} - \begin{cases} 0 & \text{für } i_0 < N_{FFT}/2 \\ 1 & \text{für } i_0 \geq N_{FFT}/2 \end{cases}$$

In one configuration it is provided that the receiver is configured to receive a plurality of telegram fragments transmitted by the transmitter, wherein the telegram fragments each have a subpilot sequence, wherein the telegram fragments complement each other to form a telegram which contains data transmitted by the transmitter, wherein the telegram fragments are shorter than a single telegram comprising the transmitted data and wherein the subpilot sequences complement each other to form a pilot sequence.

The signal evaluation device starting from the subpilot sequences and using the DFT method determines a value for a frequency difference between a transmission frequency of the transmitter and a receive frequency of the receiver. This occurs by the signal evaluator determining values of decision variables for each subpilot sequence, combining the determined values of the decision variables over the subpilot sequences, and determining a maximum value with the combined values.

The signal evaluation device executes a frequency estimate for the frequency difference by the signal evaluation device determining a frequency estimate based on a maximum value obtained by determining the maximum value and at least one value adjacent to the maximum value with respect to a frequency variable.

According to one configuration, the receiver is configured to receive at least one telegram transmitted by the transmitter, wherein the telegram comprises a pilot sequence. The signal evaluation device determines, starting from the pilot sequence and using the DFT method, a value for a frequency difference between a transmission frequency of the transmitter and a receive frequency of the receiver by the signal evaluation device determining values of decision variables for the pilot sequence and executing a determination of a maximum value. The signal evaluator determines a frequency estimate for the frequency difference by performing a frequency estimate from a maximum value obtained by determining the maximum value and at least one value adjacent to the maximum value with respect to a frequency variable.

In one configuration it is provided that the signal evaluation device receives the maximum value based on the maximum value and a positive comparison of the maximum value with a decision threshold.

According to a configuration, the signal evaluation device generates the frequency estimated value from the maximum value and two adjacent values, wherein the two adjacent values precede or follow the determined maximum value with regard to the frequency variable.

In one configuration it is provided that the signal evaluation device determines a polynomial for the maximum value and the two adjacent values, and that the signal evaluation device determines the frequency estimated value from an extreme value associated with the polynomial.

One configuration is that the signal evaluation device executes the interpolation with a second degree polynomial.

In accordance with one configuration, the signal evaluation device (12) executes the interpolation with a polynomial of the following form: $y(x)=y_0-c(x-x_0)^2$, wherein the free parameters $y_0$, $c$ and $x_0$ are determined on the basis of the maximum value and the adjacent values.

The transformation device determines a maximum value of the interpolation curve with the following function:

$$x_0 = \frac{1}{2} \frac{y(1) - y(-1)}{2y(0) - y(1) - y(-1)},$$

wherein $x_0$ is an abscissa value of a maximum of the polynomial, $y(0)$ is the maximum value, and $y(-1)$ and $y(1)$ are the adjacent values.

A second degree polynomial of the form $y(x)=y_0-c(x-x_0)^2$ is used as an interpolation function in one configuration.

The abscissa value $x_0$ of the polynomial maximum, for example, represents the improved time estimate (normalized to the sampling interval T/N).

From the abscissa value $x_0$ of the polynomial maximum, the improved frequency estimated value can be calculated via $$\hat{\nu}T = \frac{i_0 + x_0}{N_{FFT}} - \begin{cases} 0 & \text{für } i_0 < N_{FFT}/2 \\ 1 & \text{für } i_0 \geq N_{FFT}/2 \end{cases}$$

In accordance with one configuration, the signal evaluation device determines the time-estimated value and uses it for redetermine the frequency difference by the signal evaluation device during a renewed determination of the values of the decision variables using samples of the respective subpilot sequences which are shifted by the time-estimated value, or by shifting reference symbols of a reference sequence by the time-estimated value in time.

In one configuration it is provided that the signal evaluation device executes an interpolation of the samples of the respective subpilot sequences for the renewed determination of the frequency difference.

According to a configuration, after the frequency difference has been redetermined, the signal evaluation device carries out a frequency estimate for the frequency difference by the signal evaluation device determining a frequency estimate on the basis of a maximum value obtained by determining the maximum value and a positive comparison with the decision threshold and at least one value adjacent with respect to a frequency variable.

The aforementioned configurations of the receiver can also be implemented for the synchronization method—if needed as part of a method for receiving signals.

One configuration of the method which is complementary or alternative to the aforementioned configurations provides that a plurality of telegram fragments transmitted by the transmitter are received by the receiver,
wherein the telegram fragments each comprise a subpilot sequence,
wherein the telegram fragments complement each other to form a telegram containing data transmitted from the transmitter,
wherein the telegram fragments are shorter than the telegram,
wherein the subpilot sequences complement each other to form a pilot sequence,
that the receiver is synchronized with the transmitter starting from the subpilot sequence s,
wherein a value for a frequency difference between a transmission frequency of the transmitter and a receive frequency of the receiver is determined starting from the subpilot sequences and using the DFT method,
by determining values of decision variables for each subpilot sequence,
by combining the determined values of the decision variables over all subpilot sequences, and
by determining a maximum value with the combined values.

One configuration provides that a plurality of telegram fragments transmitted by the transmitter are received by the receiver, wherein the telegram fragments each comprise a subpilot sequence, wherein the telegram fragments complement each other to form a telegram containing data transmitted by the transmitter, wherein the telegram fragments are shorter than the telegram, wherein the subpilot sequences complement each other to form a pilot sequence.

Starting from the subpilot sequences, the receiver is synchronized with the transmitter. Starting from the subpilot sequences and using the DFT method, a value for a frequency difference between a transmission frequency of the transmitter and a receive frequency of the receiver is determined by determining values of decision variables for each subpilot sequence, by combining the determined values of the decision variables over all subpilot sequences with one another and by determining a maximum value with the combined values. A time estimate for a time offset between a reference point in time of a transmission of the telegram fragment and a value assumed and/or estimated for the evaluation of the telegram fragment for the reference point in time is carried out by the signal evaluation device determining a time estimate for a time offset starting from a maximum value obtained by determining the maximum value and at least one value adjacent to the maximum value with respect to a time variable.

One configuration is that at least one telegram transmitted by the transmitter is received by the receiver, wherein the telegram comprises a pilot sequence, wherein starting from the pilot sequence, the receiver is synchronized with the transmitter, wherein starting from the pilot sequence and by using the DFT method, a value for a frequency difference between a transmission frequency of the transmitter and a reception frequency of the receiver is determined by determining values of decision variables for the pilot sequence, by executing a determination of a maximum value with the determined values, wherein a time estimate for a time offset is carried out between a reference point in time of a transmission of the telegram fragment and a value assumed and/or estimated for the evaluation of the telegram fragment for the reference point in time, by the signal evaluation device determining a time estimate value for a time offset starting from maximum value obtained by the determination of the maximum value and at least one value which is adjacent to the maximum value with respect to a time variable.

One configuration provides that a plurality of telegram fragments transmitted by the transmitter are received by the receiver, wherein the telegram fragments each comprise a subpilot sequence, wherein the telegram fragments complement each other to form a telegram containing data transmitted by the transmitter, wherein the telegram fragments are shorter than the telegram, wherein the subpilot sequences complement each other to form a pilot sequence, wherein the receiver is synchronized with the transmitter starting from the subpilot sequences. Starting from the subpilot sequences and using the DFT method, a value for a frequency difference between a transmission frequency of the transmitter and a receive frequency of the receiver is determined by determining values of decision variables for each subpilot sequence, by combining the determined values of the decision variables over all subpilot sequences with one another and by determining a maximum value with the combined values. A frequency estimate for the frequency difference is carried out by determining a frequency estimate of the signal evaluation device from a maximum value obtained by determining the maximum value and at least one value adjacent to the maximum value with respect to a frequency variable.

One configuration is that at least one telegram transmitted by the transmitter is received by the receiver, wherein the telegram has a pilot sequence. Starting from the pilot sequence, the receiver is synchronized with the transmitter. Starting from the pilot sequence and using the DFT method, a value for a frequency difference between a transmission frequency of the transmitter and a receive frequency of the receiver is determined by determining values of decision variables for the pilot sequence, by determining a maximum value with the determined values. A frequency estimate is carried out for the frequency difference by determining a frequency estimate of the signal evaluation device from a maximum value obtained by determining the maximum value and at least one value adjacent to the maximum value with respect to a frequency variable.

The above configurations of the receiver can be realized by steps of corresponding configurations of the method so that here a repetition of the explanations is dispensed with.

Depending on its design, the receiver uses a method for frequency estimate in the case of fragmented transmission, thus, in the case of fragmentation of telegrams in "telegram splitting".

In one configuration, the DFT method for frequency estimate is thus extended to telegram splitting.

In one configuration, a combination is made after the DFT, which is used for the individual telegram fragments, and before the maximum value search which thus relates to all telegram fragments.

In one configuration, the signal processing of the DFT method up to and including the DFT is applied to each telegram fragment in order to combine the results before the maximum value search via the frequency hypotheses. Thereby, further processing is based on the combined values.

The advantage of this combination is significant noise suppression, which significantly improves the estimated frequency and time.

In one configuration, a combination takes place by weighted addition of individual results, e.g. the magnitudes or magnitude squares.

In different configurations, a weighted addition of the each individually determined values of the decision variables is carried out by an addition
of the magnitudes,
the sum of the magnitudes of the real and imaginary parts, or
of the magnitude squares.

Mathematically, the configurations can be formulated as follows:

Given that $d_{i,n}[k]$ are the decision variables (for i=0, 1, ..., NDFT-1) of the $k^{th}$ sampling time after the DFT of the $n^{th}$ fragment.

Then it applies:

$$\text{addition of the magnitudes: } |d_i[k]| = \sum_{n=0}^{N_{frag}-1} c_n |d_{i,n}[k]| \quad (5)$$

$$\text{addition of magnitudes Re and Im: } |d_i[k]| = \sum_{n=0}^{N_{frag}-1} c_n (|\text{Re}\{d_{i,n}[k]\}| + |\text{Im}\{d_{i,n}[k]\}|) \quad (6)$$

$$\text{Addition of the magnitude squares: } |d_i[k]|^2 = \sum_{n=0}^{N_{frag}-1} c_n^2 |d_{i,n}[k]|^2 \quad (7)$$

In one configuration it is provided that the symbol grid remains constant over the duration of all transmitted fragments and that the distance between the fragments (e.g. in number of symbol intervals) is known to the receiver. In this case, the $k^{th}$ samples from each telegram fragment (counted from the beginning of the fragment) correspond to each other. Furthermore, it is provided in one configuration that the frequency storage does not change significantly over the duration of all fragments.

In one configuration, a coherent combination occurs, i.e. a combination according to the amount and phase of the determined value of the decision variable. This is especially the case if the carrier phase remains the same from telegram fragment to telegram fragment, i.e. the coherence must be given by the telegram fragments.

The choice of the weighting factors for the addition of the values of the decision variables is specified in more detail in some configurations.

In one configuration, the above weighting factors $c_n$ are selected in proportion to the root from the estimated signal-to-noise power ratio $SNR_n$ of the $n^{th}$ telegram fragment, wherein the estimated SNR in one configuration also includes the power of any available interference signals. This corresponds to the Maximum Ratio Combining (MRC) for antenna diversity.

In the case of interference powers, which may be different for the individual fragments, one configuration provides for the weighting factors to be set in proportion to the root from the ratio $SNR_n/PN_n$ of the estimated SNR to the estimated noise power $PN_{of}$ the $n^{th}$ telegram fragment.

The choice of weighting factors maximizes the SNR in the decision variable after the combination.

Alternatively, the above weight factors $c_n$ are set to 1. This corresponds to the well-known Equal Gain Combining (EGC) for antenna diversity.

One configuration represents an improvement of the estimated parameter values.

In one configuration, thereby, the time estimate is improved by means of interpolation.

In order to increase the accuracy of the time estimate, it is provided to improve the time estimate by an interpolation between the maximum value (thus $|d_i[k_0]|$), the value before (thus $|d_i[k_0-1]|$) and the value after (thus $|d_i[k_0+1]|$) after determination of the time index $k_0$ in the DFT method.

The two neighbor values must have the same frequency index as the maximum value, i.e. $i=i_0[k_0]$.

A second degree polynomial of the form $y(x)=y_0-c(x-x_0)^2$ is used as an interpolation function in one configuration.

In one configuration, the free parameters $y_0$, $c$ and $x_0$ are determined such that the polynomial runs through the three values $y(-1)=|d_i[k_0-1]|$, $y(0)=|d_i[k_0]|$ and $y(1)=|d_i[k_0+1]|$.

The abscissa value $x_0$ of the polynomial maximum represents the improved time estimate (normalized to the sampling interval T/N). It can be calculated from the three given y-values as follows:

$$x_0 = \frac{1}{2}\frac{y(1) - y(-1)}{2y(0) - y(1) - y(-1)}.$$

In an alternative or supplementary configuration, the frequency estimate is improved by means of interpolation.

In order to increase the accuracy of the frequency estimate, one configuration provides to improve the frequency estimate by an interpolation between the maximum value at position $i_0$ (thus $d_{i_0}[k_0]$), the value for $i0-1$ (thus $d_{i_0-1}[k_0]$) and the value for $i_0+1$ (thus $d_{i_0+1}[k_0]$) after determining the time index $k_0$.

The two neighboring values must originate from the same DFT from which the maximum value was determined. This is the DFT at time $k_0$.

In one configuration, a second degree polynomial of the form $y(x)=y_0-c(x-x_0)^2$ is used as an interpolation function. This corresponds to the previously mentioned polynomial as described to improve time estimate.

The free parameters $y_0$, $c$ and $x_0$ are determined such that the polynomial runs exactly through the three values $y(1)=|d_{i_0+1}[k_0]|y(-1)=|d_{i_0-1}[k_0]|$, $y(0)=|d_{i_0}[k_0]|$.

From the abscissa value $x_0$ of the polynomial maximum, the improved frequency estimated value can be calculated via $$\hat{v}T = \frac{i_0 + x_0}{N_{FFT}} - \begin{cases} 0 & \text{für } i_0 < N_{FFT}/2 \\ 1 & \text{für } i_0 \geq N_{FFT}/2 \end{cases} \quad (8)$$

The value $x_0$ can be calculated from the three given y-values according to formula (8).

In one configuration, the following sequence of measures to improve the estimated value is provided.

In order to optimize time and frequency estimate, it is provided to work with an oversampling factor of N=2 in one configuration and to perform the following operations in the specified order:

1. Interpolation in the time range as described above. One result is the time estimate $\hat{\tau}$.
2. Approximate calculation of L new samples of the signal $x(t)$ in the symbol clock, wherein the sampling times are shifted by $\hat{\tau}$ in relation to the original. This is done expediently by means of interpolation filtering of the existing samples $x[k-LN-1], x[k-LN], \ldots, x[k+2]$.

An FIR filter with four coefficients is used as an interpolation filter in one configuration. Experience has shown that this provides sufficient accuracy with 2-fold oversampling.

In order to calculate the filter coefficients, the method of minimizing the mean square error (Minimum Mean Square Error=MMSE) is used, wherein the convolution of the modulation pulse with the impulse response of the receive filter serves as the calculation basis. With a matched filter as receive filter, this is the AKF of the modulation pulse.

The filter coefficients can be calculated and stored a priori for a sufficiently fine grid of time estimate hypotheses (e.g. 0.01T grid). The filter whose time hypothesis is closest to the current estimated time $\hat{\tau}$ is used in each case.

3. Recalculation of the decision variable $d_i[k_0]$ based on the samples interpolated in the previous step. Thereby, a different DFT length can be selected.

Since only three output values of the DFT are of interest, this can be replaced by multiplying it three times by samples of three complex exponential oscillations with the frequencies $$v_0 T - \frac{1}{N_{DFT}},$$

and $$v_0 T v_0 T + \frac{1}{N_{DFT}},$$

while maintaining the DFT length.

4. Polynomial interpolation in the frequency range as described above. One result is the frequency estimate $\hat{v}$.
5. In order to further improve the estimated values, a second polynomial interpolation is then carried out in a further configuration, using values that lie in a denser frequency grid. For this, the DFT input values must be multiplied three times with samples of three complex exponential oscillations by the frequencies $\hat{v}T-\Delta vT$, $\hat{v}T$ and $\hat{v}T+\Delta vT$, wherein $\Delta \gamma T \ll 1/N_{DFT}$ is to be selected.

In one configuration it applies:

$$\Delta vT = \frac{1}{8N_{DFT}}.$$

As an alternative to steps 3 to 5, a procedure for direct estimation of the remaining frequency offset is used in one configuration. This is, for example, the method according to Louise and Reggiannini.

For this purpose, only the following steps may be used:
3. Calculation of L values according to $$z[l]=x[k-(L-1-l)N]a^*[l]e^{j2\pi l v_0 T} \text{ for } l=0,1,2,\ldots,L-1, \quad (9)$$

wherein the samples x[·] are the interpolated values from the 2$^{nd}$ step. The multiplication by a complex exponential oscillation with the frequency $v_0T$ corresponds to a frequency correction by the frequency $v_0T$.

4. Executing the calculations according to formulae (2) and (4) with the values from formula (9). The estimated value for the entire frequency offset is then calculated from the sum of $v_0T$ and the estimated value from formula (4).

Furthermore, the invention relates to a signal transmission system which comprises at least one transmitter in one of the configurations discussed above and at least one receiver in one of the configurations discussed above.

Finally, the invention relates to a computer program with a program code for executing the above method according to one of the above configurations.

BRIEF DESCRIPTION OF THE DRAWINGS

Embodiments of the present invention will be detailed subsequently referring to the appended drawings, in which.

With telegram splitting (see e.g. DE 10 2011 082 098 A1), data to be transmitted are not transmitted in one data packet, but several data packets are generated, which may be transmitted with different frequencies and at different times. Thus, several telegram fragments are generated from one telegram. Each telegram fragment has a pilot sequence which is used for synchronization between transmitter and receiver. The pilot sequences are identical in one configuration and different in another configuration.

The pilot sequence consists of a number of L modulation symbols (also referred to as pilot symbols or here in the text pilot sequence symbols) and is usually transmitted compactly either at the beginning (preamble) or in the middle (midamble) of the telegram. Alternatively, the pilot sequence can also be arbitrarily scattered between the data symbols. It is common practice to take the pilot symbols from the same modulation alphabet as the data symbols (e.g. multiple phase-shift keying, M-PSK, or M-ary Quadrature Amplitude Modulation, M-QAM). The pilot symbols are known to the recipient in advance or are stored appropriately.

In receivers, it is common practice to mix the receive signal down into the baseband after bandpass filtering and to sample and quantize it equidistantly in time using an analog-todigital converter (ADC). Each sampled value is complex-valued and consists of a real and an imaginary part. Sampling thereby is carried out at least in symbol clock or, as a rule, at an integer multiple thereof (oversampling).

For the time estimate and frequency estimate involved for synchronization, several methods are known, which are described in the following.

Figure 1:
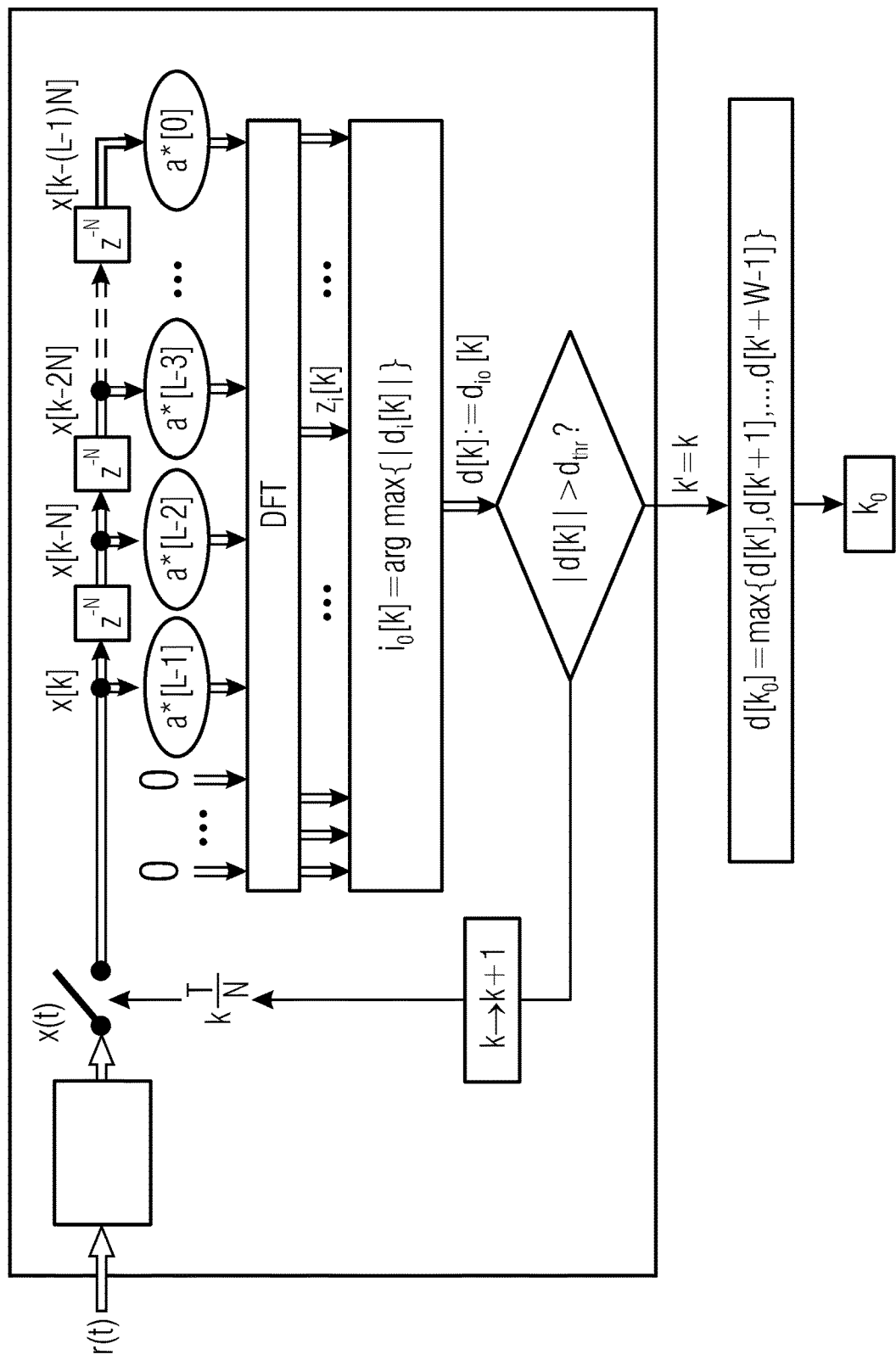
FIG. 1 shows a schematic representation of a signal processing for time and frequency estimate.

DFT method:

In [9] a method is described which is also suitable for large frequency offsets. The frequency offset is the frequency difference between the carrier frequency of the transmission signal and the center frequency of the receive filter. The essential signal processing steps are illustrated in FIG. 1.

Thereby, T is the symbol spacing or 1/T is the symbol rate. N is the oversampling factor and k*T/N specifies the time of the k$^{th}$ sampled value. The pilot symbols are designated a[0], a[1], a[L-1], wherein a[0] is transmitted first and a[L-1] last. The superscript character * indicates that the conjugated complex value is to be used. The delay element is identified by z-N, where the delay is N samples. Furthermore, W is the window length for maximum value search in number of sampled values.

Time variables in round brackets are time-continuous, e.g. r(t) specifies the time-continuous receive signal. In contrast, time variables in square brackets are time-discrete and usually represent a consecutive numbering of samples. For example, x[k] specifies the k$^{th}$ value of the (time-continuous) signal x(t) after the receive filter.

After the receive filter, which generates the signal x(t) from the signal r(t), the signal is sampled equidistantly in time with N values per symbol and quantized. At each time k, L samples are taken at symbol spacing (i.e. every N$^{th}$ sample) and first multiplied by the L conjugated complex pilot symbols. These are multiplied by the samples of a complex exponential oscillation and then summed up. The last procedure is executed several times for different frequencies of this oscillation, which are called frequency hypotheses. For equidistant frequency hypotheses, this corresponds to the discrete Fourier transformation (DFT) of the L products x[k]a*[L-1], x[k-N]a*[L-2] to x[k-(L-1)N]a*[0].

The DFT can be carried out particularly efficiently with the known algorithm of the fast Fourier transformation (FFT), provided that L is a power of two. If L is not a power of two, the DFT length is rounded to the next higher power of two and a corresponding number of zeros is added to the L values so that an FFT can be applied. To increase the accuracy of the frequency estimate, the L FFT input values can be supplemented by any number of additional zeros.

Each frequency hypothesis yields a complex value identified by $d_i[k]$, which is referred to as a decision variable. The index i refers to the $i^{th}$ frequency. For each time step k, the maximum of the amount $|di[k]|$ is determined for all frequency indices i. The frequency index belonging to the maximum is identified by i0. If this maximum is above a decision threshold $d_{thr}$, a pilot sequence (alternatively also referred to as training sequence) is considered to be recognized. The associated time index is identified by k'. In the positive case that the maximum lies above the decision threshold, k' is thus set equal to k. In the negative case, k is increased (k becomes k+1, FIG. 1). The comparison with the decision threshold is optional in each case.

It is known that a further analysis of the received signal is needed for a more accurate time estimate.

Further processing is as follows:

The decision variables at the time k' and for each following time k' are analyzed and the maximum amount within a time window of given duration is determined. The time index belonging to this maximum is identified by $k_0$.

The frequency belonging to the index $i_0[k_0]$ already represents a rough estimate of the frequency offset. It is identified by $v_0$ and is given by $$v_0 T = \frac{i_0}{N_{DFT}} - \begin{cases} 0 & \text{für } i_0 < N_{DFT}/2 \\ 1 & \text{für } i_0 \geq N_{DFT}/2 \end{cases} \quad (1)$$

For additive Gaussian disturbances, the DFT method is optimal in terms of maximum likelihood estimation. It is applicable for frequency offset up to almost half the symbol rate. The estimation accuracy is essentially limited by the oversampling factor N and the DFT length NDFT. For large N and large NDFT, the mean square estimation error for both time and frequency comes close to the theoretically achievable limit (Cramer-Rao barrier). The method can be used for any pilot sequences.

Frequency estimate according to Luise and Reggiannini:

The estimator according to Luise and Reggiannini is based on the following values:

$$R[\lambda] = \frac{1}{L-\lambda} \sum_{l=0}^{L-\lambda-1} z[l+\lambda] z*[l] \text{ for } \lambda = 0, 1, \ldots, \Lambda \quad (2)$$

with $$z[l] = x[k-(L-1-l)N] a*[l] \quad (3)$$

The frequency estimate results from:

$$\hat{v}T = \frac{1}{\pi(\Lambda+1)} \arg\left\{\sum_{\lambda=1}^{\Lambda} R[\lambda]\right\} \quad (4)$$

The estimator has the following features:

Within the usable estimation range, it is also unbiased for low $E_S/N_0$—thus, energy per symbol as a measure of the signal-to-noise ratio—as spectral noise power density.

For $\Lambda=L/2$ and $E_S/N_0>0$ dB, the estimator is close to the Cramer Rao barrier and for the frequency offset zero exactly on the Cramer Rao barrier. It can be described as optimal.

The range of estimates is limited to:

$$|vT| \leq \frac{0.85}{\Lambda+1}.$$

A disadvantage is that a sufficiently precise time synchronization is needed before the application. Another disadvantage is that the method is not suitable for large frequency bands due to the limited estimation range.

Phase estimation can be improved as described below.

For data-supported phase shift estimation in coherent receivers, the synchronization symbols present in a transmitted packet are usually used. Thus, the pilot symbols of the pilot sequences are used. The phases of the received symbols are compared with the expected phases (reference symbols). The difference between the two results in the phase shift. For noise reduction, for example, averaging over several symbols is executed.

An example for such a phase estimation is the Maximum Likelihood Estimator (see [6]).

This estimator achieves useful results if the exact time of transmission is known. However, this is usually determined in a previous estimate, wherein noise and other effects cause variations. In addition, due to limitations in computing power, it is not always possible to make a sufficiently accurate time estimate.

Thus, the receive symbols contain a residual time offset which is included in the phase estimation and worsens it. The residual time offset or general time offset results in a phase error which is added to the phase of interest between the transmission frequency and the receive frequency of the receiver and therefore impairs the evaluation.

In the following, configurations are described which result in an improvement of the phase estimation. The configurations also apply to an improved frequency estimate in case the frequency estimate is based on phase differences of adjacent symbols.

During the symbol recovery (e.g. by matched filtering and subsequent subsampling), a time offset also introduces a part of at least one neighboring symbol into the result. This phenomenon is described below using MSK modulation. Mapping serves, for example, to map the pilot sequence bits to the actual symbols of the pilot sequences.

In order to simplify the illustration, the following graphics each contain only three symbols. The middle symbol represents the symbol to be examined and the other two represent the previous or subsequent symbol.

Figure 2:
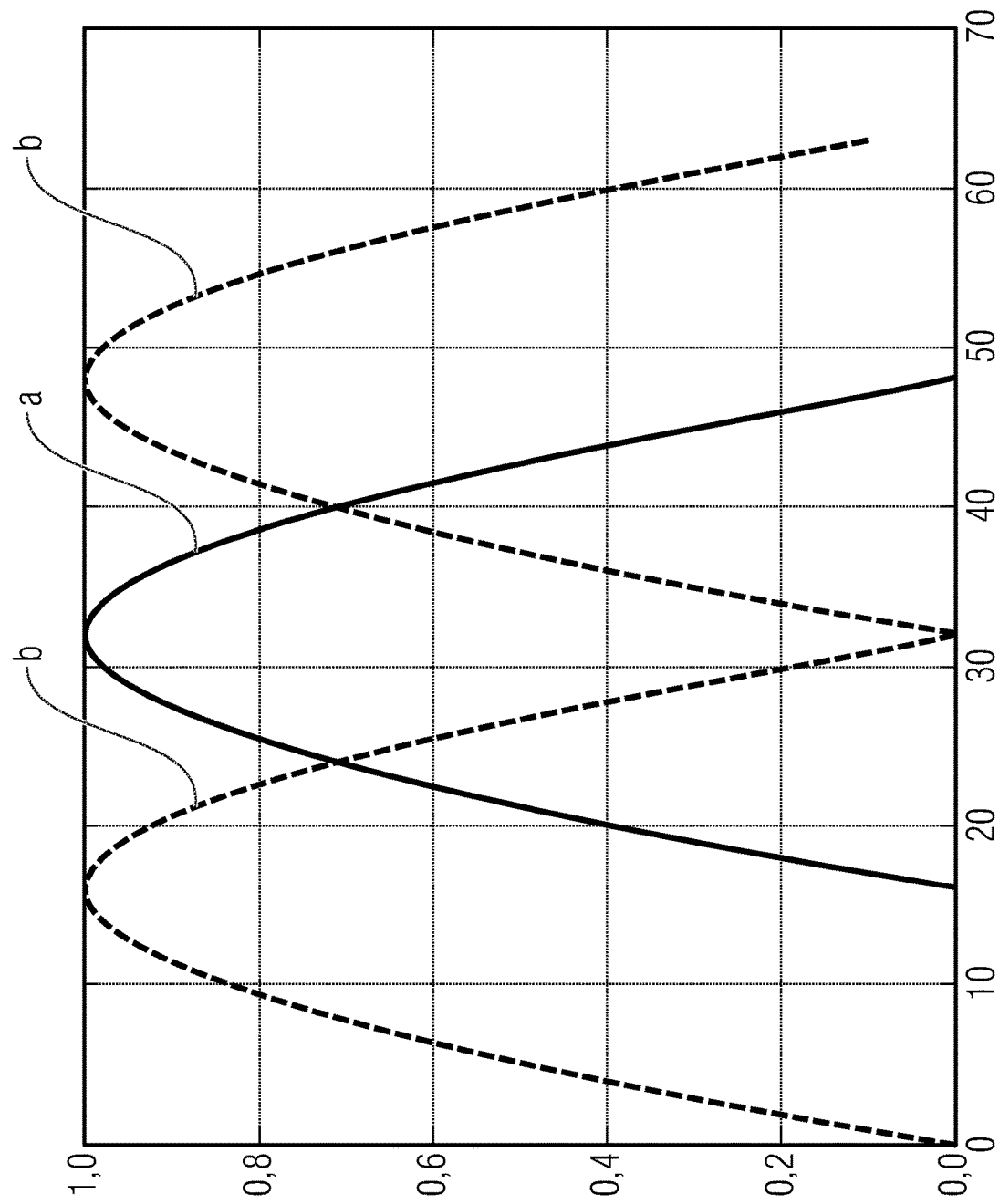
FIG. 2 shows a representation of an MSK baseband signal for three positively mapped symbols.

FIG. 2 shows an MSK baseband signal with three symbols. The symbol to be examined as well as the previous and following symbol have been mapped with positive amplitude. It is therefore a middle symbol and two flanking symbols. The curve a shows the real part and curve b shows the imaginary part of the signal. The amplitude is plotted on the y-axis relative to the time in sampling times on the x-axis.

In the following, the influence of the phase for the middle symbol which is transferred on the real part is examined. The other two flanking symbols (the previous and the following symbol) are transferred to the imaginary part as an example of mapping when the symbols to be transmitted are created, according to the MSK rule.

Figure 3:
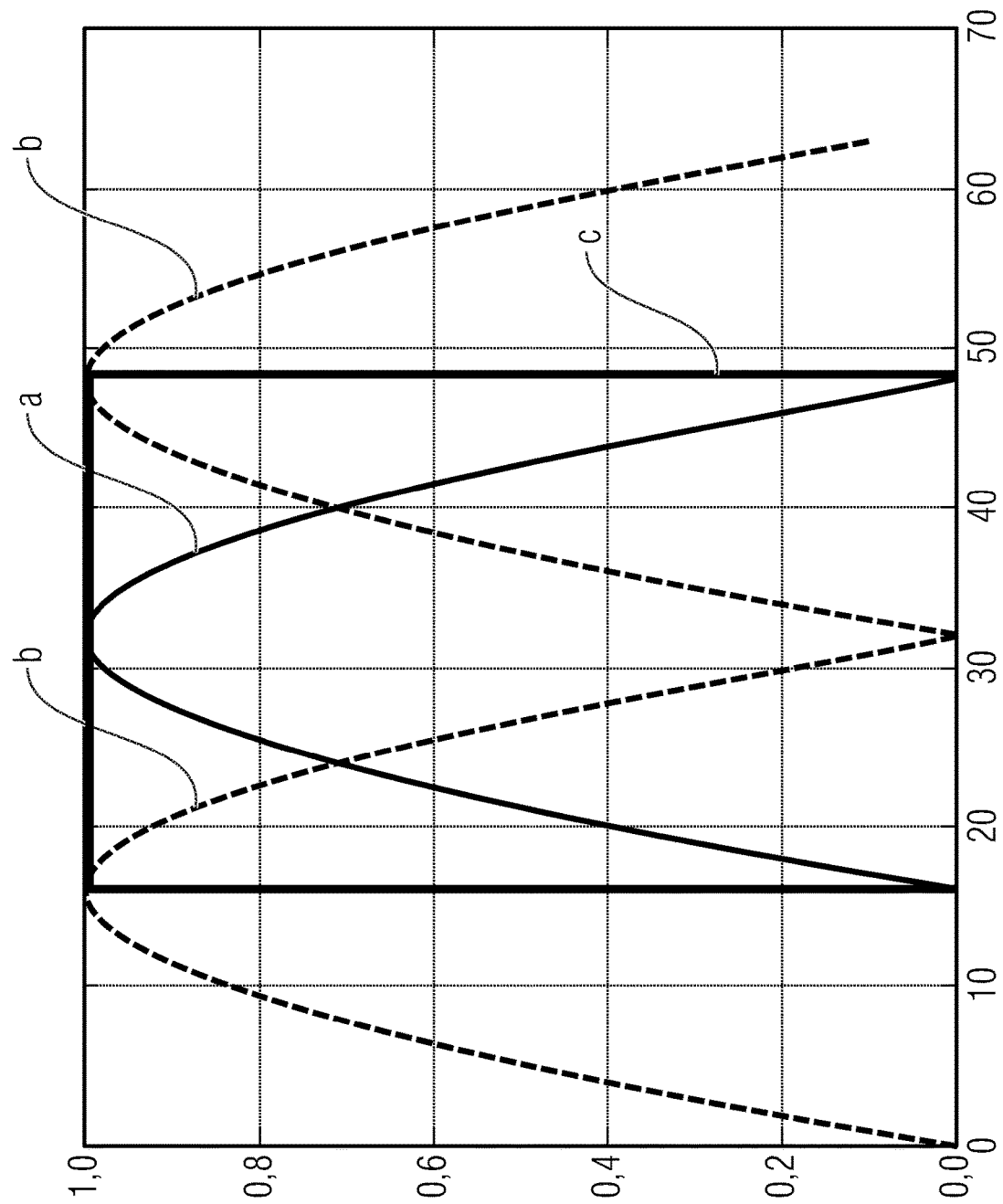
FIG. 3 shows a representation of an MSK baseband signal with ideal time offset.

The symbol recovery takes place in the receiver using a matched filter which is multiplied by the signal and then summed over the entire symbol. FIG. 3 shows the length of the matched filter (stronger curve c). The filter extends over the entire middle symbol. FIG. 3 thus illustrates the ideal case in which no time offset occurs.

Due to the special MSK modulation, a so-called ISI (Intersymbol Interference, see [7]) is inserted during matched filtering to reconstruct the symbols. Symbol crosstalk is known and can be taken into account when calculating phase differences.

For symbol recovery, the data within the area shown is cut out accordingly and multiplied by the matched filter (optimal filter) or an approximation. The symbol results from integration (in the continuous case) or summation (in the discrete case).

If the reconstructed symbol from FIG. 3 is compared with the transmission symbol (or a reference symbol available to the receiver), it becomes apparent that there is no phase shift between the two symbols.

Figure 4:
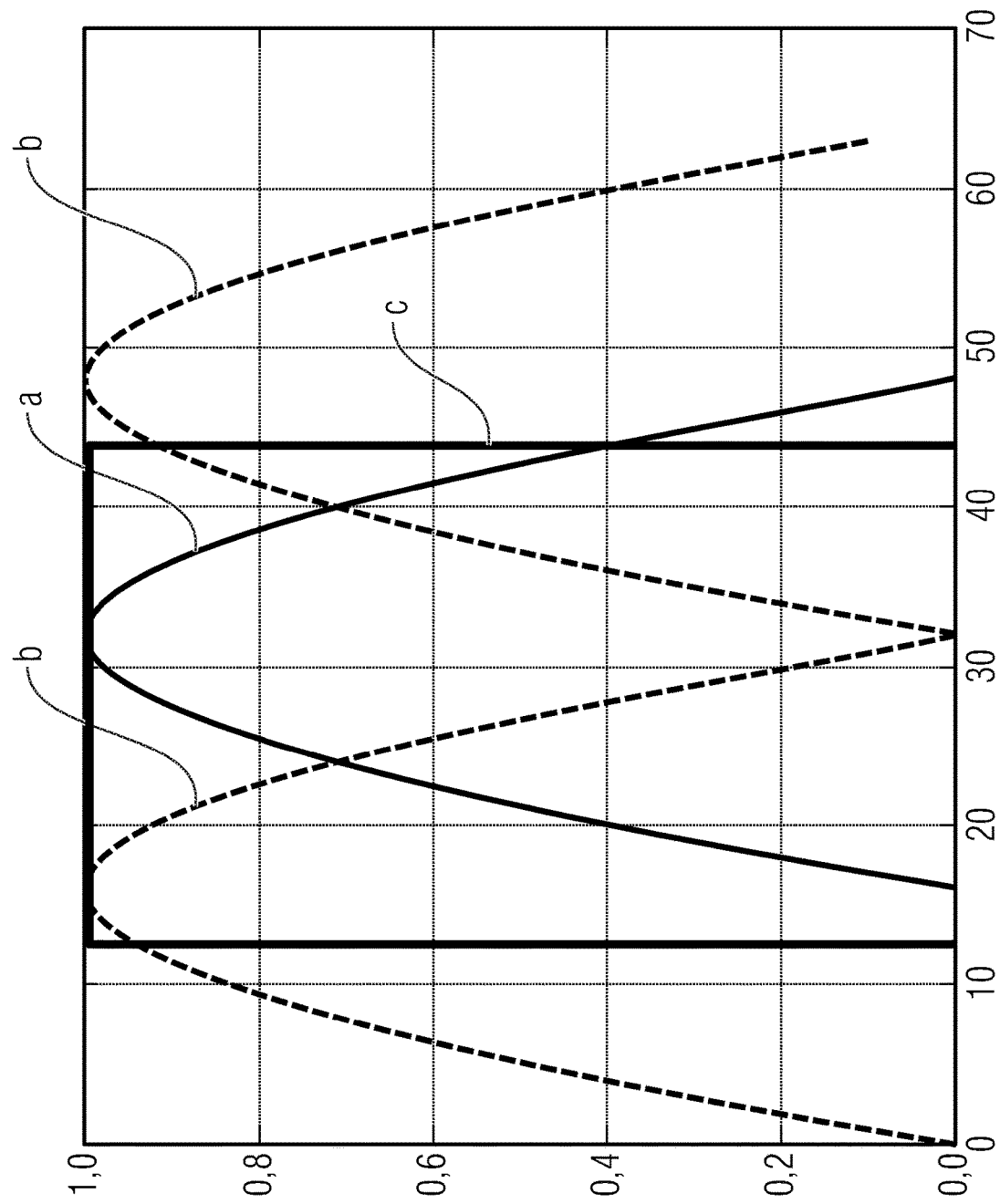
FIG. 4 shows a representation of an MSK baseband signal with a negative time offset.

However, if a time offset occurs, the window for the matched filter is moved. FIG. 4 shows this for a negative time offset in which the correct time lies after the assumed time. The start of the symbol is therefore assumed too early. For the phase determination, the time offset therefore results in a phase error as an additional error in the actual determination of the phase.

Due to the time offset, more energy of the preceding flanking symbol and less of the actually interesting middle symbol flows into the reconstruction of the middle symbol. The value thus deviates from the expected target value. However, if the received value deviates from the expected value, this deviation causes an error in the phase estimation.

Similarly, this applies to a positive time offset in which the actual symbol begins before the assumed time. This, however, increases the influence of the flanking symbol following the middle symbol.

Figure 5:
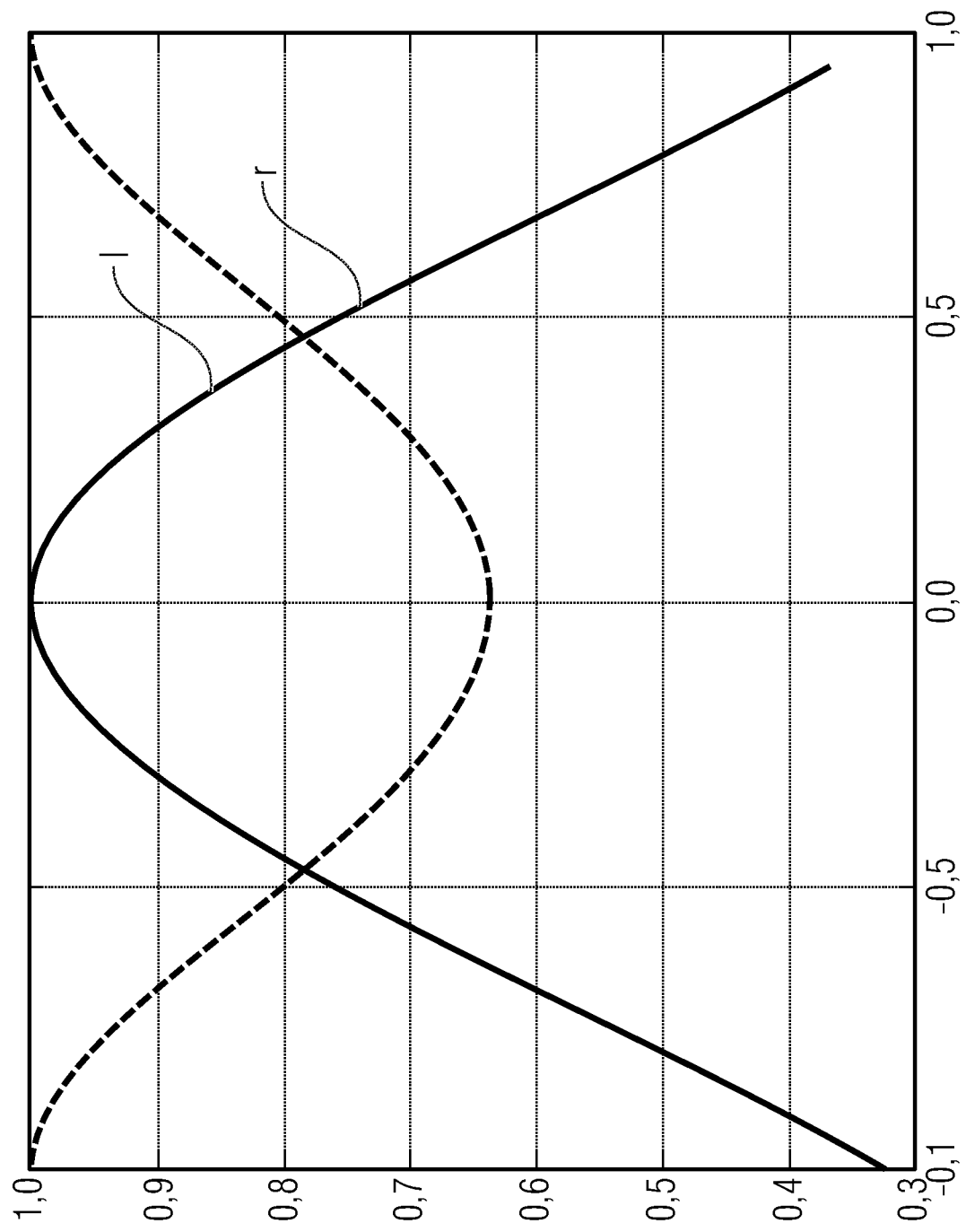
FIG. 5 shows a course of the symbol amplitude after matched filtering over the time offset.

FIG. 5 shows a course of the results of the symbol reconstruction at different time offsets. The middle represents the ideal time. The amplitude is plotted on the y-axis relative to the time offset (or alternatively referred to as timing error) in symbol lengths. The real part R and the imaginary part I are applied.

FIG. 5 shows that at the ideal time the influence of the neighboring symbols (thus, the flanking symbols in the example of FIG. 2) is least. With increasing time offset, the influence of the neighboring symbols increases, i.e. in this example with MSK modulation, the amplitude of the imaginary part increases.

If the receive symbol (thus, in this case the middle symbol) is multiplied by the conjugated complex of the transmit symbol (thus, the reference symbol or the associated symbol of the reference sequence) after matched filtering, the phase offset between the reference symbol and the considered middle symbol of the combination of three symbols of the pilot sequence of the received signal is obtained.

Figure 6:
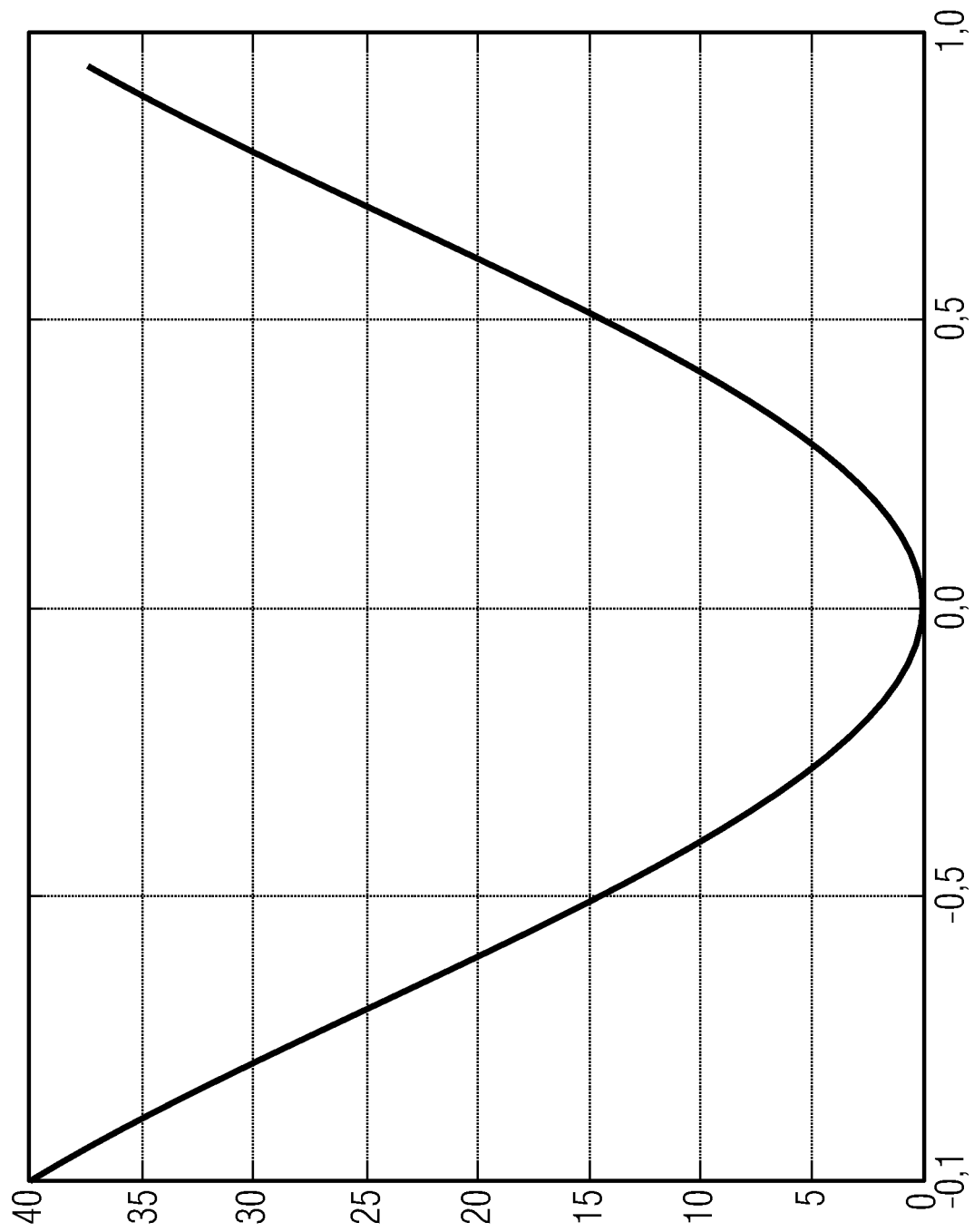
FIG. 6 shows a course of the phase offset of the symbol considered in FIG. 5 over the time offset after matched filtering and multiplication by the conjugated complex of the reference symbol.

FIG. 6 shows the phase offset for the symbol associated with FIG. 5 above the time offset. In this symbol constellation, the phase offset—thus, the resulting phase errors due to the time offset—is positive. However, the amount depends on the amount of the time offset.

The previous explanations show that the result of matched filtering and thus also the phase error for time offsets depends on the previous and following symbols—thus, the symbols flanking the middle symbol considered in the example.

In order to determine this completely, the result of the matched filtering was recalculated under time offset for another symbol constellation. The symbol to be viewed has also been mapped with positive amplitude again, however, the two flanking symbols have different amplitudes. The complex baseband signal and the result of matched filtering with different time offsets are shown in FIG. 7 and FIG. 8.

Figure 7:
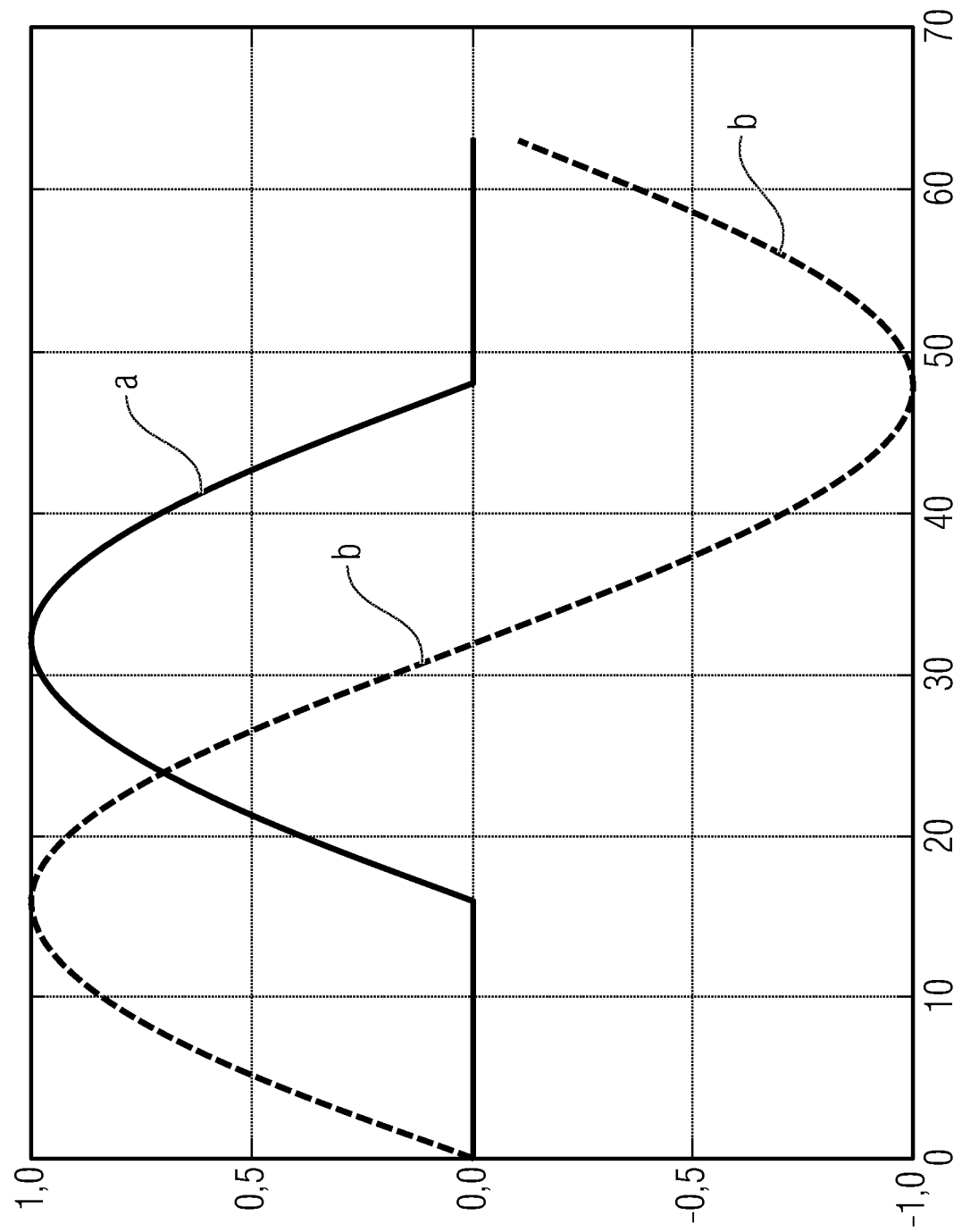
FIG. 7 shows a representation of an MSK baseband signal for three symbols, the last symbol being mapped negatively.

FIG. 7 shows the amplitude of the three symbols b, a, b relative to time in sampling rates. The two flanking symbols b comprise the middle symbol a. With this MSK signal in the selected constellation, no intersymbol interference (ISI) occurs at the ideal sampling time due to the flanking symbols with the middle symbol.

Figure 8:
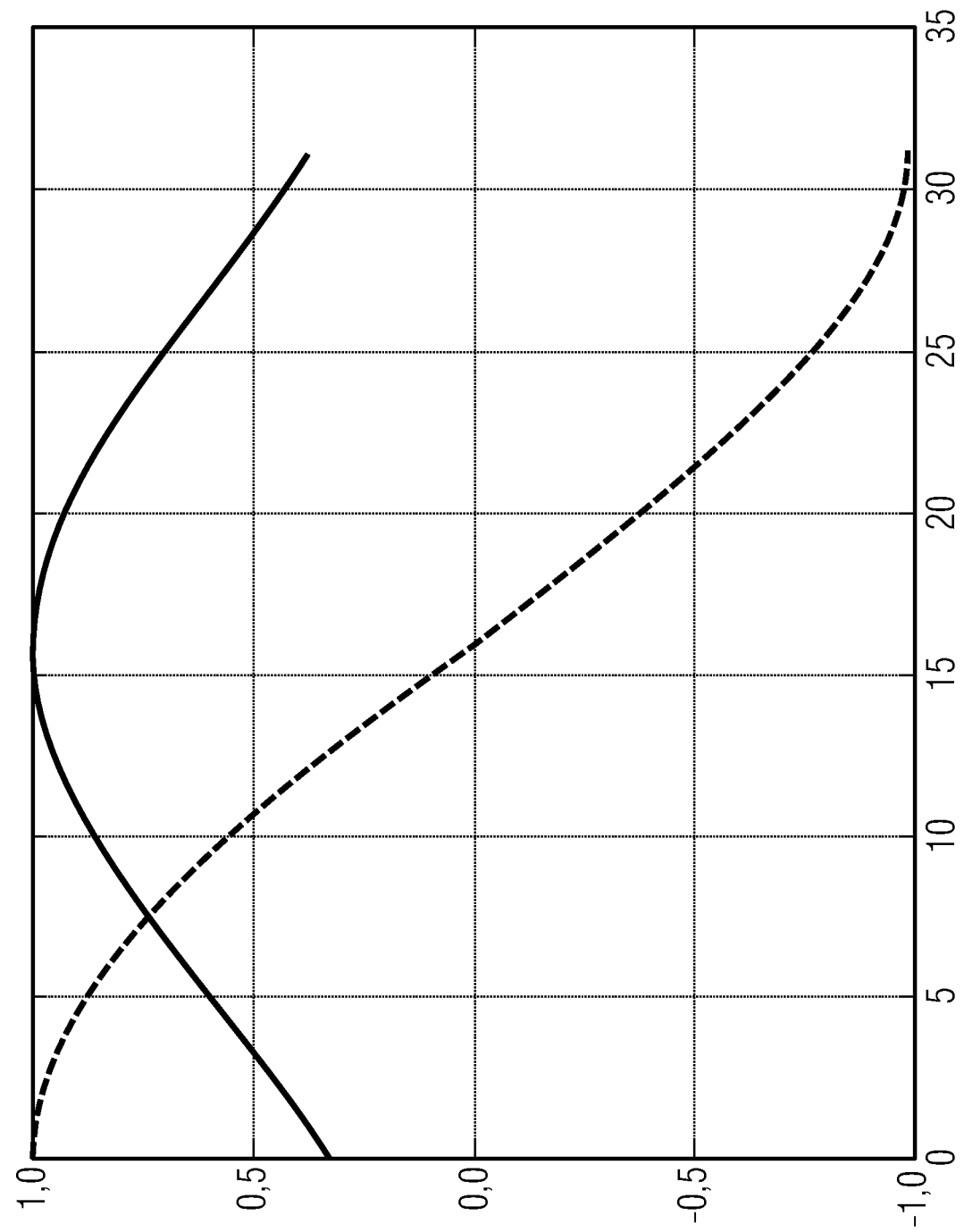
FIG. 8 shows a course of the symbol amplitude from FIG. 7 after matched filtering over the time offset.

FIG. 8 shows the amplitude of the middle symbol after matched filtering as a function of the time offset.

If, after matched filtering, the receive symbol is multiplied by the conjugated complex value of the transmission symbol in the same way as for FIG. 6, the phase offset between the reference symbol and the observed viewed receive symbol is obtained.

Figure 9:
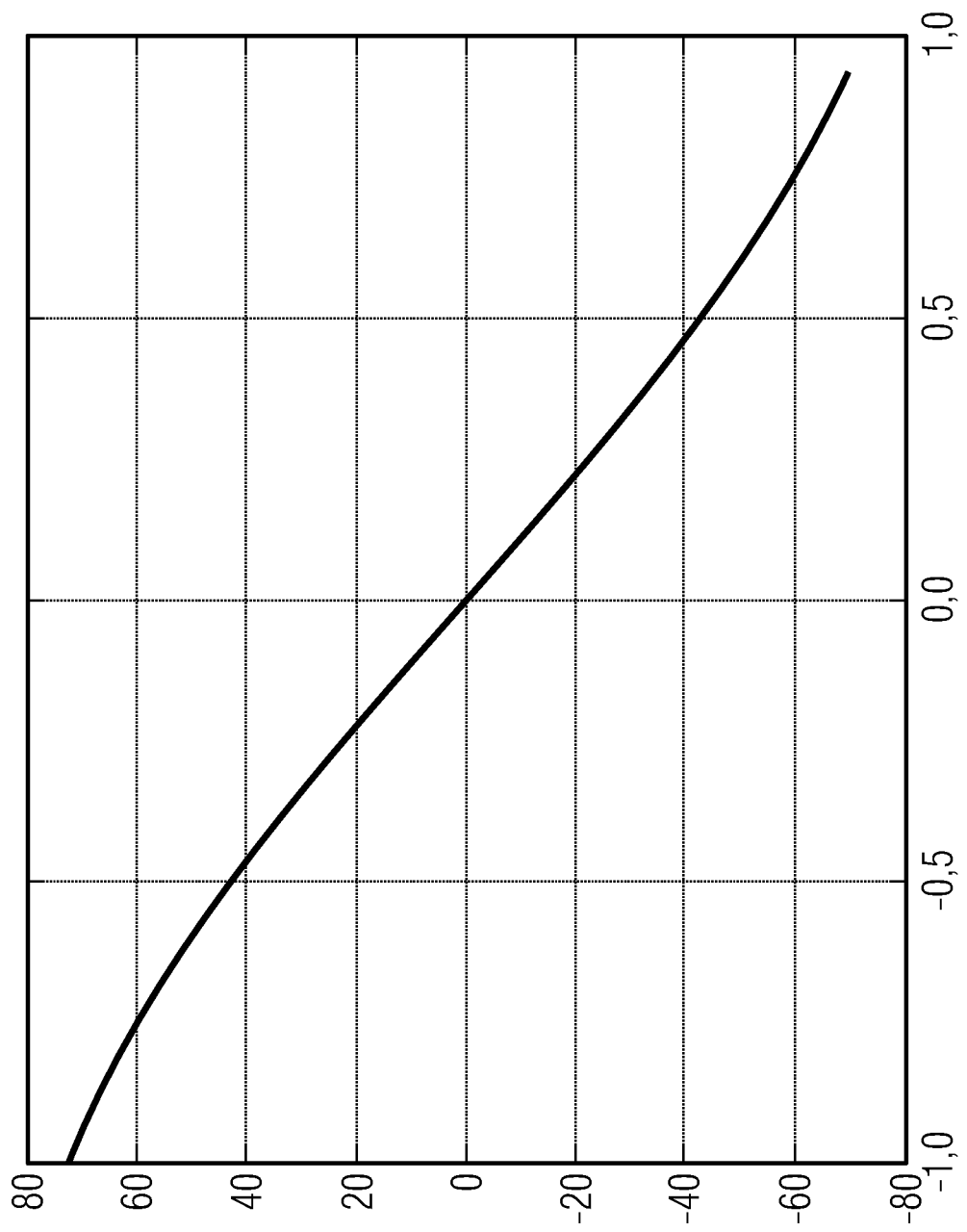
FIG. 9 shows a course of the phase offset of the symbol considered in FIG. 8 over the time offset after matched filtering and multiplication by the conjugated complex of the reference symbol.

The phase offset is shown in FIG. 9 for the middle symbol above the time offset shown in FIG. 8. Compared to FIG. 6, the course of the phase offset is no longer only positive at all possible time offsets. For negative time offsets the phase offset is positive and for positive time offsets it changes its sign and becomes negative.

Overall, the phase offset depends on the symbols that flank the evaluated symbol.

Therefore, the symbols are selected such that the phase errors resulting from a time offset in the evaluation of the individual symbols compensate each other when averaging over the affected symbols—whether from one signal or over several signals.

Figure 10:
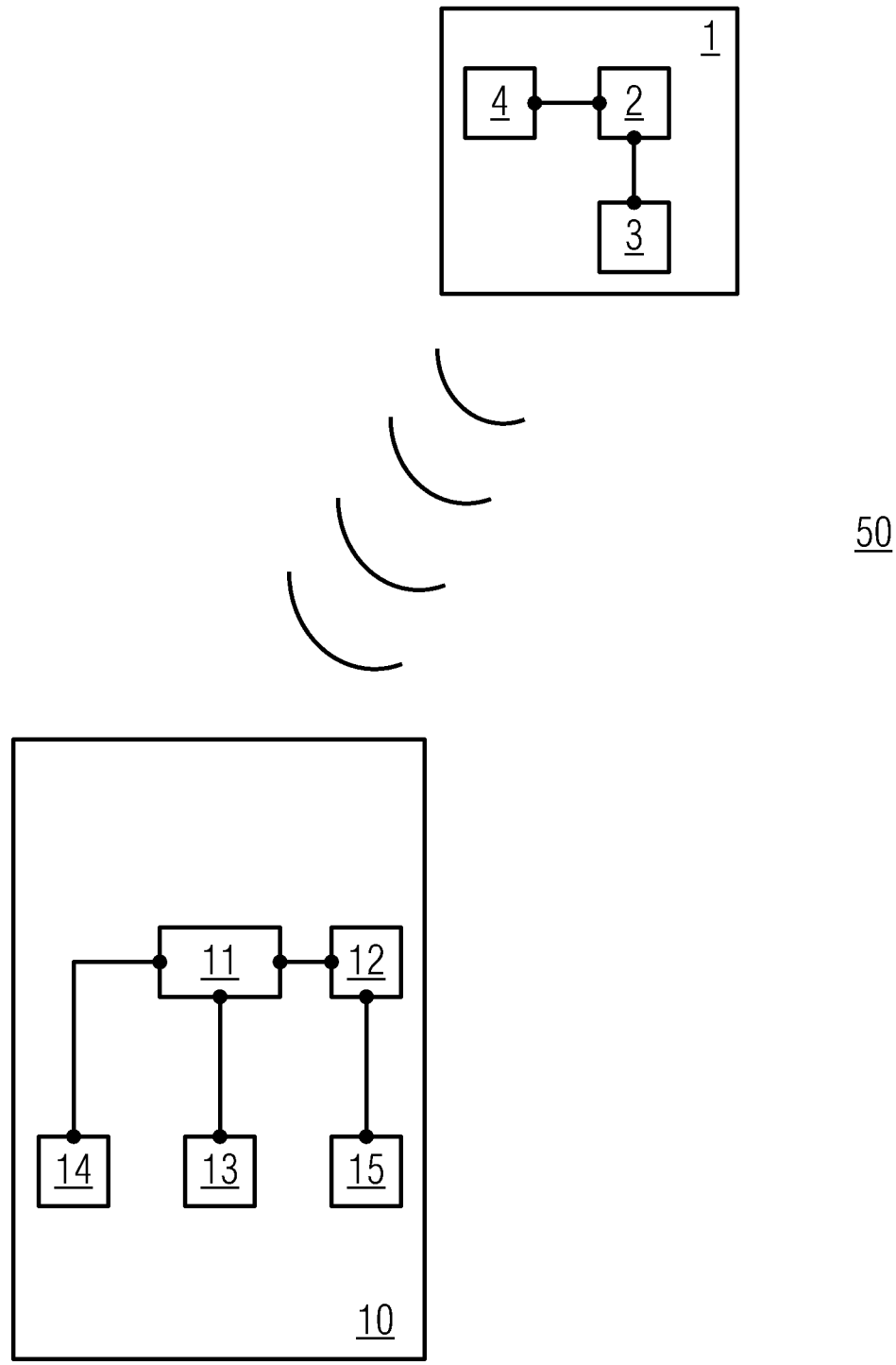
FIG. 10 shows a schematic representation of a communication system with a transmitter and a receiver.

FIG. 10 shows a System 50 with a transmitter 1 and a receiver 10.

The transmitter 1 has a signal generator 2 and a signal output device 3. The signal generator 2 generates the signals to be transmitted based on data which the transmitter 1 has to transmit. The data are, for example, sensor data or status data of the transmitter 1 itself.

In the embodiment shown, telegram splitting is used so that the data to be output is distributed to at least two signals which can also be referred to as telegram fragments. The individual telegram fragments each have a pilot sequence which is provided by the signal generator 2. The provision for the individual signals to be transmitted thereby in one configuration is that the signal generator 2 accesses a data memory 4 in which the data for the suitable pilot sequence are stored. The signal output device 3 transmits the individual telegram fragments.

The individual telegram fragments are received and processed by the receiver 10. Processing involves synchronization between transmitter 1 and receiver 10, for which the synchronization device 11 is provided. The pilot sequences with their pilot symbols are used for synchronization.

A synchronization is needed with regard to time. This refers to the estimation of the time position of the received signal and the associated optimum time for the sampling of the signal. For this synchronization, the synchronization device 11 is connected to a scanning device 13. As a rule, the sampling times cannot be influenced. Rather, the point in time is needed to reconstruct the symbols from the usually oversampled signal or to be able to carry out an interpolation otherwise.

In the example shown, a further synchronization refers to the frequency. Relevant here are the carrier frequency with which the signals from the transmitter 1 are transmitted and the center frequency of the filter device 14 with which the received signals are filtered. Alternatively, the signals are shifted in frequency after receipt in front of the filter. The difference between the two frequencies is called the frequency offset. For frequency synchronization, the filter device 14 here is connected to the synchronization device 11.

Frequency synchronization is followed—in the case of coherent demodulation or decoding—by phase synchronization. For this synchronization, the signal evaluation device 12 is described in more detail in the following, which transmits the corresponding synchronization data to the synchronization device 11.

In order to determine the phase, it is intended provided that each pilot symbol of the pilot sequence of the received signal is compared with the corresponding reference symbol of a reference sequence. The reference sequence thereby is the same as the pilot sequence which is used by the transmitter 1 to generate the signal or had been inserted into the signal. If a phase value has been determined for each pilot symbol, a total value is then generated, e.g. by averaging the individual phase values. The reference sequences are stored in a data memory 15.

However, as explained above, a time error between the window of the filter device 14 and the actual start of the symbol has a detrimental effect on the determination of the phase.

Due to the averaging by evaluating several noise suppression symbols, also an averaging over the errors with respect to the phase value is carried out. Therefore, it is intended that the mean phase error will be used for all pilot symbols during synchronization. In order to ensure that the mean error for averaging over the individual phase values is ideally zero, or at least very small, the dependence of the phase error of a symbol on the previous and subsequent symbols is taken into account on the basis of the above investigations. The symbols are thus selected in such a way that the phase errors by time offset precisely compensate each other when averaging over the individual values of the phases generated per symbol.

Since several pilot symbols are transmitted one after the other, the previous and following symbols (thus, the symbols that flank a middle symbol or a symbol considered for evaluation in the example in FIG. 2) can be defined or are known to the receiver. In order to compensate the phase error by the individual pilot symbols in total, for each symbol on which a phase error can occur, a second one is transmitted which has the opposite error (at the same time offset). This applies here to the symbols of a signal that carries a pilot sequence. In an alternative design, the phase errors average over the subpilot sequences several signals, which are in particular telegram fragments.

Therefore, in one configuration it is provided that the length of the pilot sequence is a multiple of the length of two so that an even number of additions for the averaging is created.

The effect is illustrated by an example.

If the sequence from FIG. 2 is a part of the pilot sequence, a positive phase offset is generated at a time offset, which applies to both positive and negative time offsets. In order to correct this offset, a symbol must also be transmitted for which the error at the same level indicates a negative phase error.

Figure 11:
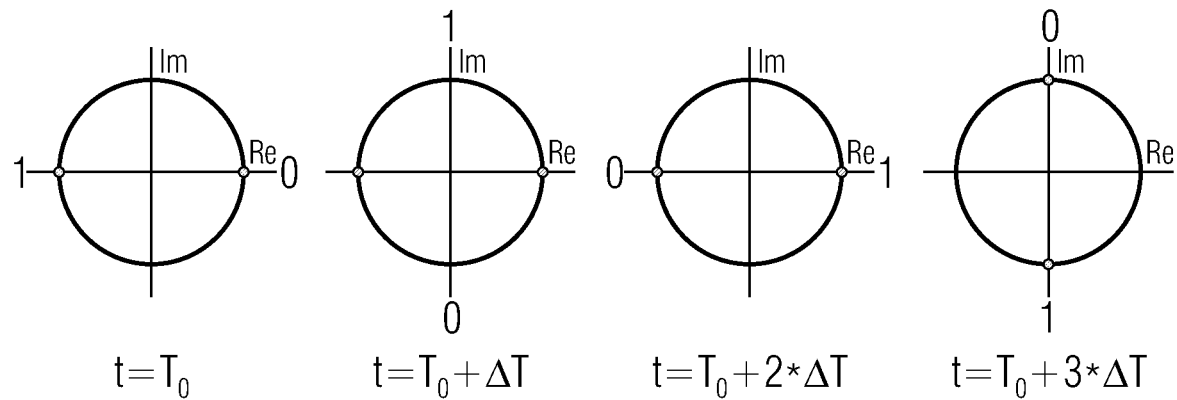
FIG. 11 shows a schematic representation of an example of a modulation used.

FIG. 11 shows the illustration of the MSK modulation. Shown are the possible constellation points of the MSK with precoding (in MATLAB also known as non-diff MSK).

The symbols to be transmitted are divided into groups of four symbols, with the first symbol being sent at time $T_0$. Accordingly, the constellation point +1+0j is selected for a binary zero in time $T_0$ and the constellation point −1+0j is selected for a binary one. The time $T_0+\Delta T$ is selected for the following symbol. The constellation points thus result in 0+1j (binary one) and 0−1j (binary zero). For the following two times, the constellation points are calculated in the same way. After four symbols have been mapped onto the constellation points, the start is again at time $T_0$.

For a pilot sequence length of eight symbols and the MSK imaging rule described above, the following sequences result, which have both a good autocorrelation and a phase error of close to zero due to a time offset.

| Consecutive number | Sequence of symbols | Note |
|---|---|---|
| 0 | [0, 1, 0, 0, 0, 0, 1, 0] | |
| 1 | [1, 0, 1, 1, 1, 1, 0, 1] | Inverted or mirrored sequence 0. |
| 2 | [0, 0, 0, 1, 0, 1, 1, 1] | |
| 3 | [1, 1, 1, 0, 1, 0, 0, 0] | Inverted or mirrored sequence 2. |

Therefore, the pilot sequence with which the transmitter 1 transmits the signals is defined such that the sum of the phase offsets is minimized in the event of a time offset.

For a pilot sequence length of twelve symbols and the MSK imaging rule described above, the following sequences were found to have both good autocorrelation and a phase error of close to zero at time offset.

| Consecutive number | Sequence of symbols in bits | $|\varepsilon_v|$ max |
|---|---|---|
| 0 | [0, 0, 0, 0, 0, 1, 1, 0, 1, 0, 1, 1] | 0.0132892511307 |
| 1 | [0, 0, 0, 1, 0, 0, 0, 0, 1, 0, 1, 1] | 0.00604862976372 |
| 2 | [0, 0, 0, 1, 0, 1, 0, 0, 1, 1, 1, 1] | 0.00669831471134 |
| 3 | [0, 0, 0, 1, 0, 1, 1, 1, 1, 0, 1, 1] | 0.00214046117234 |
| 4 | [0, 0, 0, 1, 1, 0, 1, 0, 1, 1, 1, 1] | 0.00228803319793 |
| 5 | [0, 1, 0, 0, 0, 0, 1, 0, 1, 1, 1, 0] | 0.00214191618191 |
| 6 | [0, 1, 0, 0, 1, 1, 1, 1, 1, 0, 1, 0] | 0.00228803319793 |
| 7 | [0, 1, 0, 1, 0, 0, 1, 1, 1, 1, 1, 0] | 0.0132920410548 |
| 8 | [0, 1, 0, 1, 1, 1, 1, 1, 0, 0, 1, 0] | 0.00228488288132 |
| 9 | [0, 1, 1, 1, 0, 1, 0, 0, 0, 0, 1, 0] | 0.00214482669223 |
| 10 | [0, 1, 1, 1, 1, 0, 1, 0, 0, 0, 1, 0] | 0.00604466832967 |
| 11 | [1, 0, 0, 0, 0, 1, 0, 1, 1, 1, 0, 1] | 0.00604862889634 |
| 12 | [1, 0, 1, 0, 0, 0, 0, 0, 1, 1, 0, 1] | 0.00229275981363 |
| 13 | [1, 0, 1, 0, 0, 0, 1, 0, 0, 0, 0, 1] | 0.0089182616364 |
| 14 | [1, 0, 1, 0, 1, 1, 0, 0, 0, 0, 0, 1] | 0.0132892511307 |
| 15 | [1, 0, 1, 1, 0, 0, 0, 0, 0, 1, 0, 1] | 0.00229275939358 |
| 16 | [1, 0, 1, 1, 1, 0, 1, 0, 0, 0, 0, 1] | 0.0060426888597 |
| 17 | [1, 0, 1, 1, 1, 1, 1, 0, 0, 0, 1, 0] | 0.00670003795849 |
| 18 | [1, 1, 0, 1, 0, 0, 0, 0, 1, 0, 0, 0] | 0.00604466832967 |
| 19 | [1, 1, 0, 1, 1, 1, 1, 0, 1, 0, 0, 0] | 0.00214046162904 |
| 20 | [1, 1, 1, 0, 0, 1, 0, 1, 0, 0, 0, 0] | 0.00228645779938 |
| 21 | [1, 1, 1, 0, 1, 0, 0, 0, 0, 1, 0, 0] | 0.00214191618191 |
| 22 | [1, 1, 1, 0, 1, 0, 0, 0, 1, 0, 0, 0] | 0.00229295513208 |
| 23 | [1, 1, 1, 0, 1, 0, 1, 1, 0, 0, 0, 0] | 0.00669917633491 |
| 24 | [1, 1, 1, 0, 1, 1, 1, 1, 0, 1, 0, 0] | 0.0060426888597 |
| 25 | [1, 1, 1, 1, 0, 0, 1, 0, 1, 0, 0, 0] | 0.0132808813584 |
| 26 | [1, 1, 1, 1, 0, 1, 0, 1, 1, 0, 0, 0] | 0.00855923745514 |

Thereby, the zeros and ones are the pilot sequence bits which result in the symbols of the pilot sequence or the subpilot sequence by a corresponding mapping.

The value $|\varepsilon_v|_{max}$ is the maximum systematic frequency estimate deviation using correlation, taking into account a sampling time error from −0.25T to +0.25T and a frequency offset of vT of the receive signal between −0.05 to +0.05.

Figure 12:
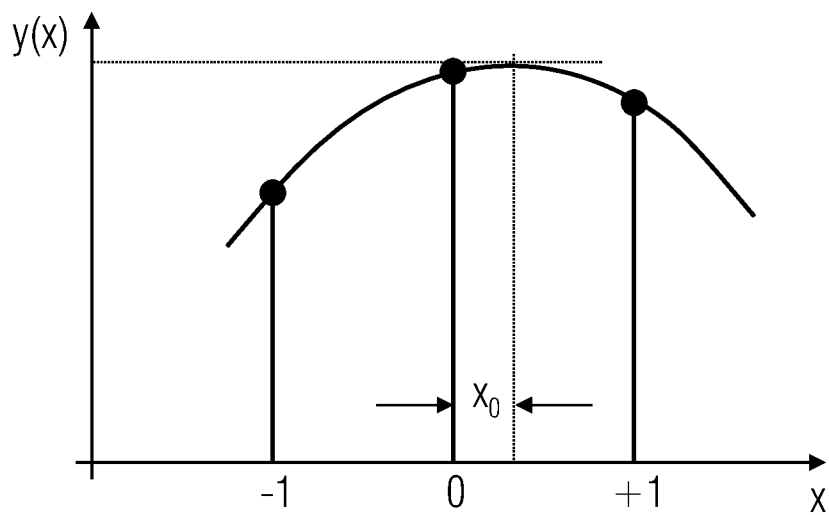
FIG. 12 shows a clarification of an interpolation by a second degree polynomial.

FIG. 12 shows a second degree polynomial of the form $y(x)=y_0-c(x-x_0)^2$ v, as it has been described in configurations to improve time and/or frequency estimate by means of interpolation.

Although some aspects have been described in connection with a device, it is understood that these aspects also represent a description of the corresponding method so that a block or component of a device is also to be understood as a corresponding method step or as a feature of a method step. Analogously, aspects described in connection with or as a method step are also a description of a corresponding block or detail or feature of a corresponding device. Some or all of the method steps can be executed by a hardware device (or using a hardware device), such as a microprocessor, a programmable computer, or an electronic circuit. In some embodiments, some or more of the most important method steps can be executed by such an apparatus.

Depending on certain implementation requirements, embodiments of the invention may be implemented in hardware or in software or at least partially in hardware or at least partially in software. The implementation may be carried out using a digital storage medium, such as a floppy disk, a DVD, a BluRay disk, a CD, a ROM, a PROM, an EPROM, an EEPROM or a FLASH memory, a hard disk or another magnetic or optical memory, on which electronically readable control signals are stored which can interact or interact with a programmable computer system to carry out the respective method. Therefore, the digital storage medium may be computer-readable.

Some embodiments according to the invention thus include a data carrier containing electronically readable control signals capable of interacting with a programmable computer system such that one of the methods described herein is carried out.

In general, embodiments of the present invention may be implemented as a computer program product with program code, the program code being effective to perform one of the methods when the computer program product runs on a computer.

The program code can, for example, also be stored on a machine-readable carrier.

Other embodiments include the computer program for carrying out any of the methods described herein, wherein the computer program is stored on a machine-readable medium. In other words, an embodiment of the inventive method is thus a computer program that includes a program code to perform one of the methods described herein when the computer program runs on a computer.

A further embodiment of the inventive methods is thus a data carrier (or a digital storage medium or a computer-readable medium) on which the computer program for the implementation of one of the methods described herein is recorded. The data carrier or digital storage medium or computer-readable medium is typically tangible and/or non-volatile.

A further embodiment of the inventive method is thus a data stream or a sequence of signals which represent the computer program for the execution of one of the methods described herein. The data stream or the sequence of signals can, for example, be configured to be transferred via a data communication link, for example, via the Internet.

A further embodiment includes a processing device, such as a computer or programmable logic device, configured or adapted to carry out any of the methods described herein.

Another embodiment includes a computer on which the computer program for carrying out one of the methods described herein is installed.

A further embodiment according to the invention comprises a device or system adapted to transmit a computer program to a receiver to execute at least one of the methods described herein. The transmission can take place electronically or optically, for example. For example, the receiver may be a computer, a mobile device, a storage device, or a similar device. For example, the device or system may include a file server for transmitting the computer program to the receiver.

In some embodiments, a programmable logic device (such as a field-programmable gate array, FPGA) can be used to carry out some or all of the functionality of the methods described herein. In some embodiments, a field-programmable gate array may interact with a microprocessor to carry out one of the methods described herein. In general, in some embodiments, the methods are executed by any hardware device. This can be universal hardware, such as a computer processor (CPU), or hardware specific to the process, such as an ASIC, or a microprocessor, such as an ARM architecture.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Z. Y. Choi and Y. H. Lee, "Frame synchronization in the presence of frequency offset," Communications, IEEE Transactions on, vol. 50, no. 7, pp. 1062-1065, 2002.
[2] Sust, M. K.; Kaufmann, R. F.; Molitor, F.; Bjornstrom, G. A.: Rapid acquisition concept for voice activated CDMA communication. In: IEEE Global Telecommunications Conference, 1990 Bd. 3, 1990, S. 1820#1826
[3] International patent application "Optimized Preamble and Methods for Interference Robust Packet Detection for Telemetry Applications" (PCT/EP2016/057014)
[4] G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013
[5] G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.
6] Wolfgang Koch, Script for the Seminar "Empfangersynchronisation" (*Receiver Synchronization*) at Fraunhofer IIS, 10.06.2015-15.06.2015
[7] Uwe Lambrette, Ralf Mehlan and Heinrich Meyr, Comparison of Demodulation Techniques for MSK, RWTH Aachen, https://www.ice.rwth—-aachen.de/fileadmin/publications/Lambrette95TIRR.pdf, last retrieved: 19.09.2016
[8] Kay, Steven M.: Fundamentals of Statistical Signal Processing: Detection theory. Upper Saddle River, N.J.: Prentice Hall PTR, 1998. ISBN 9780135041352
[9] Umberto Mengali, Aldo N. D'Andrea: "Synchronization Techniques for Digital Receivers" Plenum Press, 1997, ISBN 0-306-45725-3
10] Walter Kellermann: "Digital Signal Processing", lecture notes from WS 2016/17, Chair of Multimedia Communication and Signal Processing (LMS) at the Friedrich-Alexander-University Erlangen-Nuremberg.

[11] Steven M. Kay: "Fundamentals of Statistical Signal Processing—Vol. 2: Detection Theory", Prentice Hall, 1998, ISBN: 0-13-345711-7

[12] Z. Y. Choi and Y. H. Lee, "Frame synchronization in the presence of frequency offset", IEEE Transactions on Communications, vol. 50, no. 7, pp. 1062-1065, 2002.

The invention claimed is:

1. A transmitter,
wherein the transmitter is configured to transmit at least one signal with a pilot sequence comprising several pilot symbols,
wherein the transmitter comprises a signal generator,
wherein the signal generator provides the pilot sequence,
wherein the signal generator provides the pilot sequence such that the pilot sequence comprises at least two symbol groups with at least two pilot symbols each, and
wherein, in an evaluation of a signal received by a receiver as a result of the transmission of the signal with respect to a phase, the symbol groups generate phase errors that depend on a time offset between a reference point in time of the transmission of the signal by the transmitter and a value assumed and/or estimated for the evaluation for the reference point in time, said phase errors essentially mutually compensating each other across the symbol groups in the evaluation
wherein the signal generator provides the pilot sequence with a length of at least eight or twelve pilot symbols such that the pilot sequence or a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1],
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

2. The transmitter as claimed in claim 1, wherein the transmitter transmits signals comprising pilot sequences resulting from MSK modulation or GMSK modulation.

3. A transmitter,
wherein the transmitter is configured to transmit at least two signals each comprising a subpilot sequence with a plurality of pilot symbols,
wherein the transmitter comprises a signal generator,
wherein the signal generator provides the subpilot sequence,
wherein the signal generator provides the subpilot sequences of the signals such that the subpilot sequences each have at least one symbol group with at least two pilot symbols, and
wherein the symbol groups of the signals generate phase errors which are dependent on a time offset between a reference point in time of the respective transmission of a signal and a value assumed and/or estimated for the evaluation for the reference point in time during an evaluation of signals received from a receiver as a result of the transmission of the signals with respect to a phase, said phase errors substantially compensating each other during the evaluation jointly across the signals,
wherein the signal generator provides the subpilot sequences so that the subpilot sequences altogether comprise a portion which is present in a single or multiple form and has the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

4. The transmitter as claimed in claim 3, wherein transmitter transmits signals comprising subpilot sequences resulting from MSK modulation or GMSK modulation.

5. A method for transmitting signals, the method comprising:
transmitting at least one signal with a pilot sequence comprising several pilot symbols, wherein the pilot sequences comprises at least two symbol groups each comprising at least two pilot symbols, and
wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation over the symbol groups,
wherein the pilot sequence comprises a length of at least eight or twelve pilot symbols such that the pilot sequence or a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

6. A method for transmitting signals, the method comprising:
transmitting at least two signals each with a subpilot sequence comprising a plurality of pilot sequence symbols,
wherein the subpilot sequences each comprises at least one symbol group each comprising at least two pilot symbols, and
wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation across the signals, wherein provides the subpilot sequences are provided so that the subpilot sequences altogether comprise a portion which is present in a single or multiple form and has the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

7. A non-transitory digital storage medium having a computer program stored thereon to perform a method for transmitting signals, the method comprising:
transmitting at least one signal with a pilot sequence comprising several pilot symbols,
wherein the pilot sequences comprises at least two symbol groups each comprising at least two pilot symbols, and
wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation over the symbol groups,
wherein the pilot sequence comprises a length of at least eight or twelve pilot symbols such that the pilot sequence or a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],

[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0], wherein the zeros and ones are each pilot sequence bits prior to a modulation, when said computer program is run by a computer.

8. A non-transitory digital storage medium having a computer program stored thereon to perform a method for transmitting signals, the method comprising:

transmitting at least two signals each with a subpilot sequence comprising a plurality of pilot sequence symbols, wherein the subpilot sequences each comprises at least one symbol group each comprising at least two pilot symbols, and wherein the symbol groups during an evaluation of a signal received from a receiver as a result of the transmission of the signal with respect to a phase of a time offset between a reference point in time of a transmission of the signal and a value assumed and/or estimated for the evaluation for the reference point in time generate dependent phase errors which substantially compensate each other during the evaluation across the signals, wherein the subpilot sequences are provided so that the subpilot sequences altogether comprise a portion which is present in a single or multiple form and has the following forms:

[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0], wherein the zeros and ones are each pilot sequence bits prior to a modulation, when said computer program is run by a computer.

9. A transmitter, wherein the transmitter is configured to transmit at least one signal with a pilot sequence comprising several pilot symbols, wherein the transmitter comprises a signal generator that provides the pilot sequence, wherein the signal generator provides the pilot sequence with a length of at least twelve pilot symbols such that the pilot sequence has one of the following forms or such that a portion of the pilot sequence that forms part of the pilot sequence once or several times has one of the following forms:

[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0], wherein the zeros and ones are each pilot sequence bits prior to a modulation.

10. The transmitter as claimed in claim 9, wherein the pilot sequence results from MSK modulation or GMSK modulation.

11. A transmitter, wherein the transmitter is configured to transmit at least one signal with a pilot sequence comprising several pilot symbols, wherein the transmitter comprises a signal generator that provides the pilot sequence, wherein the signal generator provides the pilot sequence with a length of at least eight pilot symbols such that the pilot sequence has one of the following forms or such that a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
wherein the zeros and ones are each pilot sequence bits prior to a modulation.

12. The transmitter as claimed in claim 11, wherein the pilot sequence results from MSK modulation or GMSK modulation.

13. A method for transmitting signals, the method comprising:
transmitting at least one signal with a pilot sequence with several pilot symbols is transmitted,
wherein the pilot sequence is provided,
wherein the pilot sequence with a length of at least twelve pilot symbols is provided such that the pilot sequence has one of the following forms or such that a portion of the pilot sequence that forms part of the pilot sequence once or several times has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation.

14. A method for transmitting signals, the method comprising:
transmitting at least one signal with a pilot sequence with several pilot symbols is transmitted,
wherein the pilot sequence is provided,
wherein the pilot sequence with a length of at least eight pilot symbols is provided such that the pilot sequence has one of the following forms or such that a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
wherein the zeros and ones are each pilot sequence bits prior to a modulation.

15. A non-transitory digital storage medium having a computer program stored thereon to perform a method for transmitting signals, the method comprising:
transmitting at least one signal with a pilot sequence with several pilot symbols is transmitted,
wherein the pilot sequence is provided,
wherein the pilot sequence with a length of at least twelve pilot symbols is provided such that the pilot sequence has one of the following forms or such that a portion of the pilot sequence that forms part of the pilot sequence once or several times has one of the following forms:
[0, 0, 0, 0, 0, 1, 1, 0, 1, 0, 1, 1],
[0, 0, 0, 1, 0, 0, 0, 0, 1, 0, 1, 1],
[0, 0, 0, 1, 0, 1, 0, 0, 1, 1, 1, 1],
[0, 0, 0, 1, 0, 1, 1, 1, 1, 0, 1, 1],
[0, 0, 0, 1, 1, 0, 1, 0, 1, 1, 1, 1],
[0, 1, 0, 0, 0, 0, 1, 0, 1, 1, 1, 0],
[0, 1, 0, 0, 1, 1, 1, 1, 1, 0, 1, 0],
[0, 1, 0, 1, 0, 0, 1, 1, 1, 1, 1, 0],
[0, 1, 0, 1, 1, 1, 1, 1, 0, 0, 1, 0],
[0, 1, 1, 1, 0, 1, 0, 0, 0, 0, 1, 0],
[0, 1, 1, 1, 1, 0, 1, 0, 0, 0, 1, 0],
[1, 0, 0, 0, 0, 1, 0, 1, 1, 1, 0, 1],
[1, 0, 1, 0, 0, 0, 0, 0, 1, 1, 0, 1],
[1, 0, 1, 0, 0, 0, 1, 0, 0, 0, 0, 1],
[1, 0, 1, 0, 1, 1, 0, 0, 0, 0, 0, 1],
[1, 0, 1, 1, 0, 0, 0, 0, 0, 1, 0, 1],
[1, 0, 1, 1, 1, 0, 1, 0, 0, 0, 0, 1],
[1, 0, 1, 1, 1, 1, 1, 0, 0, 1, 0, 1],
[1, 1, 0, 1, 0, 0, 0, 0, 1, 0, 0, 0],
[1, 1, 0, 1, 1, 1, 1, 0, 1, 0, 0, 0],
[1, 1, 1, 0, 0, 1, 0, 1, 0, 0, 0, 0],
[1, 1, 1, 0, 1, 0, 0, 0, 0, 1, 0, 0],
[1, 1, 1, 0, 1, 0, 0, 0, 1, 0, 0, 0],
[1, 1, 1, 0, 1, 0, 1, 1, 0, 0, 0, 0],
[1, 1, 1, 0, 1, 1, 1, 1, 0, 1, 0, 0],
[1, 1, 1, 1, 1, 0, 0, 1, 0, 1, 0, 0] or
[1, 1, 1, 1, 1, 0, 1, 0, 1, 1, 0, 0],
wherein the zeros and ones are each pilot sequence bits prior to a modulation,
when said computer program is run by a computer.

16. A non-transitory digital storage medium having a computer program stored thereon to perform a method for transmitting signals, the method comprising:
transmitting at least one signal with a pilot sequence with several pilot symbols is transmitted,
wherein the pilot sequence is provided,
wherein the pilot sequence with a length of at least eight pilot symbols is provided such that the pilot sequence has one of the following forms or such that a portion of the pilot sequence that forms part of the pilot sequence once or several times has one of the following forms:
[0, 1, 0, 0, 0, 0, 1, 0],
[1, 0, 1, 1, 1, 1, 0, 1],
[0, 0, 0, 1, 0, 1, 1, 1] or
[1, 1, 1, 0, 1, 0, 0, 0],
wherein the zeros and ones are each pilot sequence bits prior to a modulation,
when said computer program is run by a computer.

* * * * *